(12) United States Patent
Babic et al.

(10) Patent No.: US 12,433,963 B2
(45) Date of Patent: Oct. 7, 2025

(54) CT CONTRAST AGENT FOR DETECTION OF CACHEXIA

(71) Applicants: UNIVERSITÉ DE GENÈVE, Geneva (CH); Adiposs SA, Geneva (CH)

(72) Inventors: Andrej Babic, Veigy-Foncenex (FR); Nathalie Stransky-Heilkron, Valserhône (FR)

(73) Assignee: UNIVERSITÉ DE GENÈVE; Adiposs SA, Geneva (CH)

( * ) Notice: Subject to any disclaimer, the term of this patent is extended or adjusted under 35 U.S.C. 154(b) by 756 days.

(21) Appl. No.: 17/430,683

(22) PCT Filed: Feb. 13, 2020

(86) PCT No.: PCT/EP2020/053768
§ 371 (c)(1),
(2) Date: Aug. 12, 2021

(87) PCT Pub. No.: WO2020/165349
PCT Pub. Date: Aug. 20, 2020

(65) Prior Publication Data
US 2022/0160900 A1    May 26, 2022

(30) Foreign Application Priority Data
Feb. 13, 2019 (EP) .................... 19157026.6

(51) Int. Cl.
A61K 49/04 (2006.01)
(52) U.S. Cl.
CPC ...... *A61K 49/0438* (2013.01); *A61K 49/0461* (2013.01); *A61K 49/0495* (2013.01)
(58) Field of Classification Search
None
See application file for complete search history.

(56) References Cited

U.S. PATENT DOCUMENTS

| | | | |
|---|---|---|---|
| 4,917,880 | A | 4/1990 | Wretlind et al. |
| 5,258,172 | A | 11/1993 | Rubin |
| 5,861,367 | A | 1/1999 | Blanvalet et al. |
| 6,124,357 | A | 9/2000 | Jung et al. |
| 2005/0079131 | A1 | 4/2005 | Lanza et al. |
| 2007/0178144 | A1 | 8/2007 | Hameyer et al. |
| 2015/0045278 | A1 | 2/2015 | Beisser et al. |
| 2018/0165808 | A1 | 6/2018 | Bagci et al. |
| 2021/0330820 | A1 | 10/2021 | Vinet et al. |

FOREIGN PATENT DOCUMENTS

| | | | |
|---|---|---|---|
| CA | 2 315 437 | A1 | 2/2001 |
| CN | 101379023 | A | 3/2009 |
| CN | 102166365 | A | 8/2011 |
| CN | 103626866 | A | 3/2014 |
| CN | 105592862 | A | 5/2016 |
| EP | 0 294 534 | A1 | 6/1987 |
| EP | 0 294 534 | | 12/1988 |
| JP | S6456623 | A | 3/1989 |
| JP | H01213233 | A | 8/1989 |
| KR | 101263733 | B1 | 5/2013 |
| WO | WO 8503004 | A1 | 7/1985 |
| WO | WO 9218169 | A1 | 10/1992 |
| WO | 2005/100596 | A1 | 10/2005 |
| WO | 2008/153928 | | 12/2008 |
| WO | 2012/080279 | A1 | 6/2012 |
| WO | 2015/127347 | A1 | 8/2015 |
| WO | 2019/030024 | | 2/2019 |
| WO | 2020/165349 | | 8/2020 |

OTHER PUBLICATIONS

Proceedings (Proceedings of the World Molecular Imaging Congress 2018, Seattle, Washington, Sep. 12-15, 2018: General Abstracts. Mol Imaging Biol 20 (Suppl 1), 1-584 (2018)) (Year: 2018).*
Guerbet (Ethiodol/Lipiodol (2013)) (Year: 2013).*
Farkas et al., "Cachexia as a major public health problem: frequent, costly, and deadly," *Journal of Cachexia Sarcopenia and Muscle* 4(3):173-178, published online Mar. 29, 2013.
Admiraal et al., "Visualisation of brown adipose tissue in humans with $^{123}$I-metaiodobenzylguanidine SPECT-CT and $^{18}$F-fluorodeoxyglucose PET-CT," *Diabetologia* 55:S277-S278, section 677, 2012.
Alavi et al., "Positron Emission Tomography Imaging in Nonmalignant Thoracic Disorders," *Seminars in Nuclear Medicine 32*(4):293-321, Oct. 2002.
Al-Bulushi et al., "The Medical Case for a Positron Emission Tomography and X-ray Computed Tomography Combined Service in Oman," *Sultan Qaboos Univ. Med. J. 13*:491-501, 2013.
Anton et al., "Nano-emulsions and Micro-emulsions: Clarifications of the Critical Differences," *Pharmaceutical Research 28*:978-985, 2011.
Anton et al., "The universality of low-energy nano-emulsification," *International Journal of Pharmaceutics 377*:142-147, 2009.
Aswathanarayan et al., "Nanoemulsions and Their Potential Applications in Food Industry," *Frontiers in Sustainable Food Systems 3*(95):1-21, Nov. 2019.
Bartelt et al., "Brown adipose tissue activity controls triglyceride clearance," *Nature Medicine 17*(2):200-205, Feb. 2011.
Blondin et al., "Selective Impairment of Glucose but Not Fatty Acid or Oxidative Metabolism in Brown Adipose Tissue of Subjects with Type 2 Diabetes," *Diabetes 64*:2388-2397, Jul. 2015.
Boellaard et al., "FDG PET/CT: EANM procedure guidelines for tumour imaging: version 2.0," *Eur. J. Nucl. Med. Mol. Imaging 42*:328-354, 2015.
Cannon et al., "Brown Adipose Tissue. More Than an Effector of Thermogenesis?" *Annals New York Academy of Sciences*:171-187, 1998.

(Continued)

*Primary Examiner* — Jake M Vu
(74) *Attorney, Agent, or Firm* — Seed IP Law Group LLP

(57) ABSTRACT

The invention relates to an iodinated CT contrast agent for non-invasive diagnosis of cachexia. This is possible by superior resolution of CT combined with CT contrast agent specific for the brown and/or beige adipose tissue (BAT).

15 Claims, 5 Drawing Sheets

(56) References Cited

OTHER PUBLICATIONS

Carter et al., "Common Causes of False Positive $F^{18}$ FDG PET/CT Scans in Oncology," *Brazilian Archives of Biology and Technology* 50:29-35, Sep. 2007.
Center for Disease Control and Prevention, "Iodine," *CDC*:May 1994 (last reviewed on Dec. 4, 2014) (2 pages).
Chen et al., "Brown Adipose Reporting Criteria in Imaging Studies (BARCIST 1.0): Recommendations for Standardized FDG-PET/CT Experiments in Humans," *Cell Metabolism* 24:210-222, Aug. 2016.
Cypess et al., "Brown Fat in Humans: Consensus Points and Experimental Guidelines," *Cell Metabolism* 20:408-415, Sep. 2014.
Cypess et al., "Identification and Importance of Brown Adipose Tissue in Adult Humans," *The New England Journal of Medicine* 360(15):1509-1517, Apr. 2009.
Daas et al., "Adipose tissue dysfunction in cancer cachexia," *J Cell Physiol.* 234:13-22, 2019.
Dong et al., "Role of brown adipose tissue in metabolic syndrome, aging, and cancer cachexia," *Front. Med.* 12(2):130-138, 2018.
European Association for the Study of the Liver (EASL) et al., "EASL-EASD-EASO Clinical Practice Guidelines for the management of non-alcoholic fatty liver disease," *Journal of Hepatology* 64:1388-1402, 2016.
Frankl et al., "Imaging Metabolically Active Fat: A Literature Review and Mechanistic Insights" *Int. J. Mol. Sci.* 20:1-21, 2019.
Giammarile et al. "Non-FDG PET/CT in Diagnostic Oncology: a pictorial review," *European Journal of Hybrid Imaging* 20:1-46, 2019.
Guerra et al., "Emergence of brown adipocytes in white fat in mice is under genetic control. Effects on body weight and adiposity," *J Clin Invest.* 102(2):412-420, Jul. 1998.
Júnior et al., "Adipose Tissue Remodeling during Cancer Cachexia," *Muscle Cells—Recent Advances and Future Perspectives*:1-16, 2018.
Kir et al., "Cachexia and Brown Fat: A Burning Issue in Cancer," *Trends in Cancer* 2(9):461-463, 2016.
Leitner et al., "Mapping of human brown adipose tissue in lean and obese young men," *PNAS* 114(32):8649-8654, Aug. 2017.
Leverge et al., "Bioavailability of oral vs intramuscular iodinated oil (Lipiodol UF) in healthy subjects," *J. Endocrinol. Invest.* 26(2 Suppl):20-26, 2003.
Lipiodol® Ultra-Fluid, Apr. 21, 2011 (w/ English Translation).
Miyagawa et al., "Energy Efficiency of Different Emulsification Methods: A Comparative Evaluation," *Japan Journal of Food Engineering* 16(1):71-74, Mar. 2015.
Paulus et al., "Brown adipose tissue and lipid metabolism imaging," *Methods* 130:105-113, 2017.
Petruzzelli et al., "A Switch from White to Brown Fat Increases Energy Expenditure in Cancer-Associated Cachexia," *Cell Metabolism* 20:433-447, 2014.
Petruzzelli et al., "Mechanisms of metabolic dysfunction in cancer-associated cachexia," *Genes and Development* 30:489-501, 2016.
Rui, "Brown and Beige Adipose Tissues in Health and Disease," *Compr Physiol.* 7(4):1281-1306, 2017.
Tarola et al., "High Performance Liquid Chromatography Determination of Fatty Acids in Drying Oils Following Lipase Action," *Journal of Chromatographic Science* 50:294-300, 2012.
Zhang et al., "PPAR-α Expression of Hepatocytes after TAE in Liver Cancer," *Journal of Dali University* 1:67-70, 2016. (w/ English Abstract).
Sohn et al., "Roentgenography of the Thoracic Duct in Man by Oral Administration of Contrast Media," *Proceedings of the Society for Experimental Biology and Medicine* 112(4): 901-903, 1963.
Anker et al., "Orphan disease status of cancer cachexia in the USA and in the European Union: a systematic review," *Journal of Cachexia, Sarcopenia and Muscle* 2019(10):22-34, Jan. 9, 2019.
Argilés et al., "Cancer cachexia: understanding the molecular basis," *Nature* 14:754-762, Nov. 2014.
Argilés et al., "The cachexia score (CASCO): a new tool for staging cachectic cancer patients," *J. Cachexia Sarcopenia Muscle* 2(2011):87-93, May 15, 2011.

Ballarò et al., "Animal models for cancer cachexia," *Cachia, nutrition and hydration* 10:281-287, 2016.
Bos et al., "Preliminary investigation of brown adipose tissue assessed by PET/CT and cancer activity," *Skeletal Radiology* 48(2019):413-419, Sep. 13, 2018.
Branca et al., "Accurate quantification of brown adipose tissue mass by xenon-enhanced computed tomography," *PNAS* 115(1):174-179, Jan. 2, 2018.
Chu et al., "Brown adipose tissue and cancer progression," *Skeletal Radiology* 49(2020):635-639, Oct. 24, 2019.
Cohade et al., "Uptake in Supraclavicular Area Fat ("USA-Fat"): Description on $^{18}$F-FDG PET/CT," *J. Nucl. Med.* 44(2): 170-176, Feb. 2003.
Fearon et al., "Definition and classification of cancer cachexia: an international consensus," *Lancet. Oncol.* 12(2011):489-495, Feb. 5, 2011.
Ferreira et al., "Novel and Highly Efficient $SnBr_2$-Catalyzed Esterification Reactions of Fatty Acids: The Notable Anion Ligand Effect," *Catal. Lett.* 143(2013):1240-1246, Sep. 4, 2013.
Gershon-Cohen et al., "Oral Hepatosplenography: Some Limitations of Iodinated, Chloriodized and Bromiodized Oils Homogenized with Various Emulsifiers," *EPO Munich Library* 72(5):795-800, Nov. 1954.
Groen, "Absorption and Metabolism of Lipiodol after Oral Administration," *American Journal of Medicine* 4(6):814-826, Jun. 1, 1948.
Hallouard et al., "Iodinated nano-emulsions as contrast agents for preclinical X-ray imaging: Impact of the free surfactants on the pharmacokinetics," *European Journal Pharmaceutics and Biopharmaceutics* 83(2013):54-62, 2013.
Hong et al., "Brown adipose tissue $^{18}$F-FDG uptake in pediatric PET/CT imaging," *Pediatr Radiol* 41(2011):759-768, Dec. 16, 2010.
Huang et al., "The Relationship between Brown Adipose Tissue Activity and Neoplastic Status: an $^{18}$F-FDG PET/CT Study in the Tropics," *Lipids in Health and Disease* 10(238):1-7, 2011.
Kir et al., "Tumor-derived PTHrP Triggers Adipose Tissue Browning and Cancer Cachexia," *Nature* 513(7516):1-26, Sep. 4, 2014.
Lee et al., "Perivascular adipose tissue in the pathogenesis of cardiovascular disease," *Atherosclerosis* 230(2013):177-184, Jul. 6, 2013.
Lim et al., "Nanoscaled Iodized Oil Emulsion as a CT Contrast Agent for the Detection of Experimental Liver Tumors in a Rat Model," *Acad. Radiol.* 17(8):985-991, Aug. 2010.
Long et al., "Causes and imaging features of false positives and false negatives on $^{18}$F-PET/CT in oncologic imaging," *Insights Imaging* 2:679-698, Sep. 9, 2011.
Sampath et al., "Imaging of Brown Adipose Tissue: State of the Art[1]," *Radiology* 280(1):4-19, Jul. 2016.
Steinberg et al., "Factors influencing brown fat activation in FDG PET/CT: a retrospective analysis of 15,000+ cases," *British Journal of Radiology* 90(1075):1-8, Jul. 1, 2017.
Vaitkus et al., "The role of adipose tissue in cancer-associated cachexia," *Experimental Biology and Medicine* 2017(242):473-481.
Vinet, "Proceedings of the World Molecular Imaging Congress 2018, Seattle, Washington, Sep. 12-15, 2018: General Abstracts," *Molecular Imaging & Biology* 20(1):1-584, Jan. 31, 2019 (Abstract Only).
Wang et al., "Positron Emission Tomography/Computed Tomography Potential Pitfalls and Artifacts," *Curr. Probl. Diagn. Radiol.* 38:156-169, Jul./Aug. 2009.
Zhang et al., "Non-invasive Imaging Methods for Brown Adipose Tissue Detection and Function Evaluation," *Intern. Med.* 8(6):1-7, Jan. 7, 2019.
Zhuang et al., "Abstract 19281: CT Molecular Imaging of Perivascular Adipose Tissue and Its Linkage to Vascular Disease," *Circulation* 134(1):1-2, Nov. 11, 2016.
Jianxian et al. (eds.), [with English Translation] "[Chapter 7] Trace Active Elements," Functional Foods, vol. 2:403, ISBN 7-5019-2523-2, Sep. 1999. (5 pages).
Jingfeng et al. (eds.), [with English Translation] "[Chapter 25] Diagnosis of New Drugs," Practical Prescription Pharmacology:675, ISBN 978-7-5091-2616-5, Apr. 2009. (7 pages).

(56) References Cited

OTHER PUBLICATIONS

Pu et al., [with English Translation] "[Chapter 4] Enema Therapy for Internal Diseases," Clinical Practical Enema Therapy:95, ISBN 978-7-5091-1836-8, Jun. 2008. (5 pages).
Renjun et al. (eds.), [with English Translation] Practical Ophthalmic Pharmacology:496, ISBN 978-7-5091-8669-5, Sep. 2015. (7 pages).
Xiaoyan et al. (eds.), [with English Translation] Concise and Practical Gastroenterology:92, ISBN 978-7-5100-5712-0, Feb. 2013. (5 pages).
Wang et al., "Preliminary study on lung volume reduction by bronchial occlusion with pingyangmycin-lipiodol emulsion," *J Intervent Radiol* 15(1):36-40, 2006 (w/ English Abstract).
Zhang et al., "Percutaneous chemotherapic agents lipiodol emulsion injection for the treatment of pedunculated hepatocellular carcinoma," *Contemporary Medicine* 15(29): 547-549, 2009 (w/ English Abstract).
Wu et al., "Influence of brown adipose tissue activity on 18F-FDG uptake in tumors," Tumor 33(9):765-769, Sep. 2013 [with English Abstract]. (5 pages).
Yuan et al., "Clinical application progress of FDG PET dual-phase imaging," Journal of Clinical and Experimental Medicine 12(22): 1853-1857, Oct. 2013 [with English Abstract]. (6 pages).

\* cited by examiner

FIG: 1
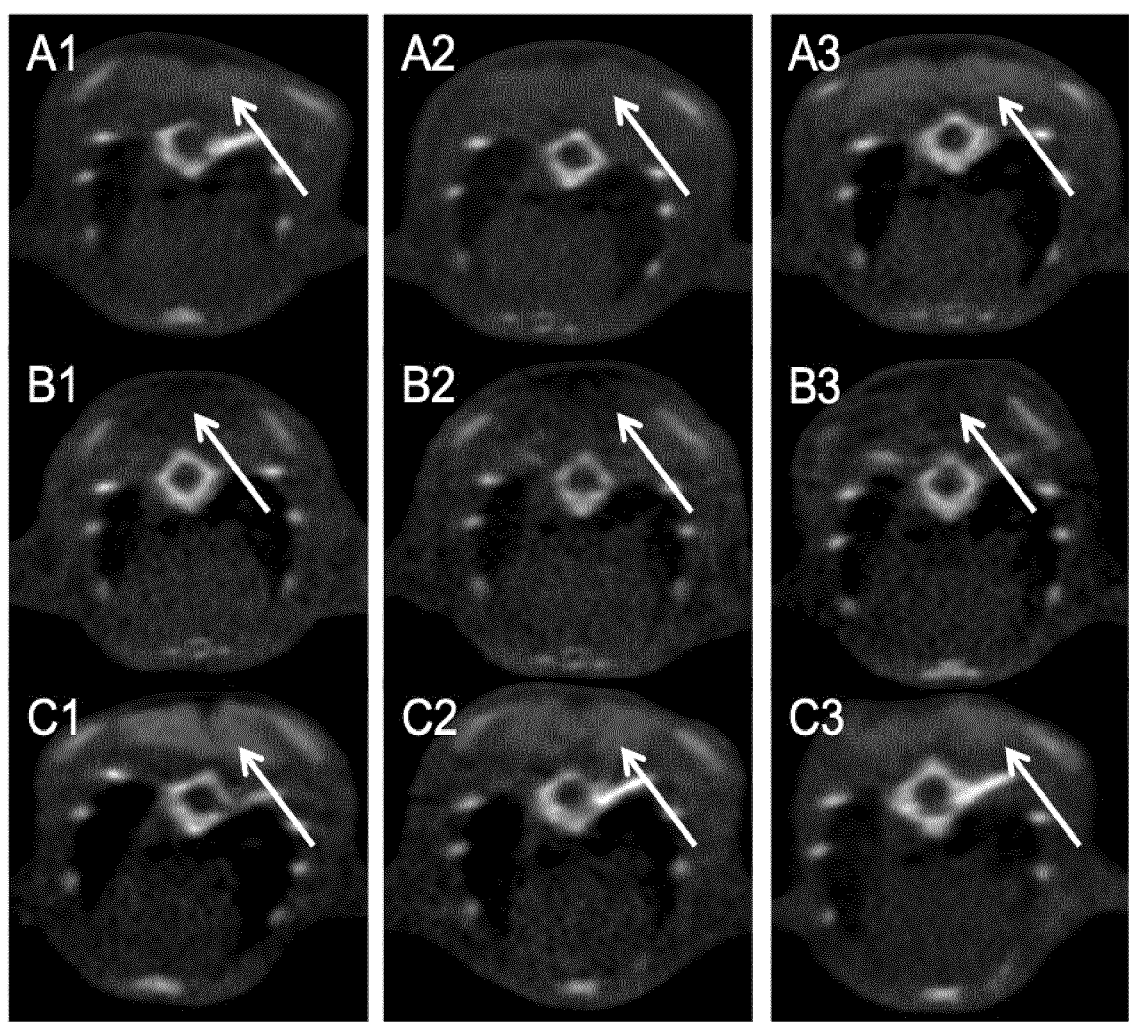

FIG: 2
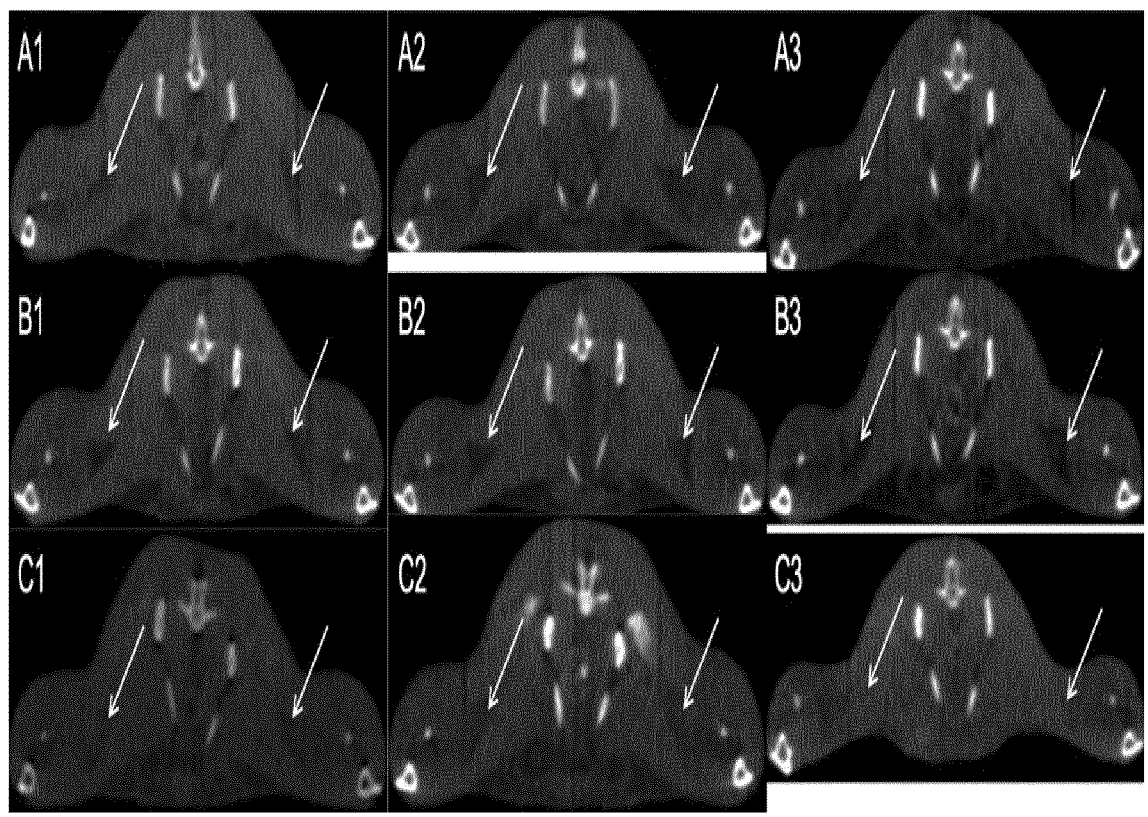

FIG: 3
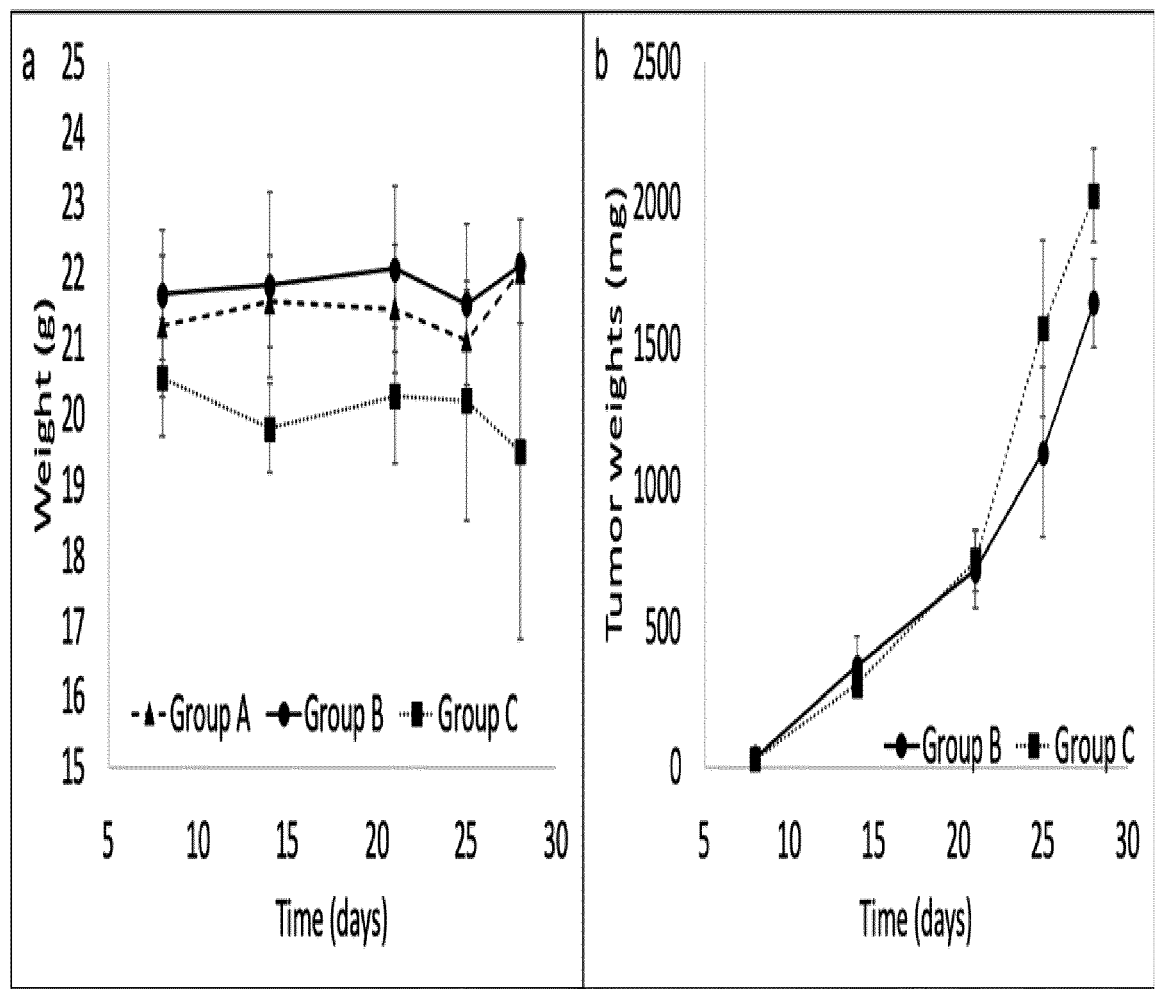

FIG: 4
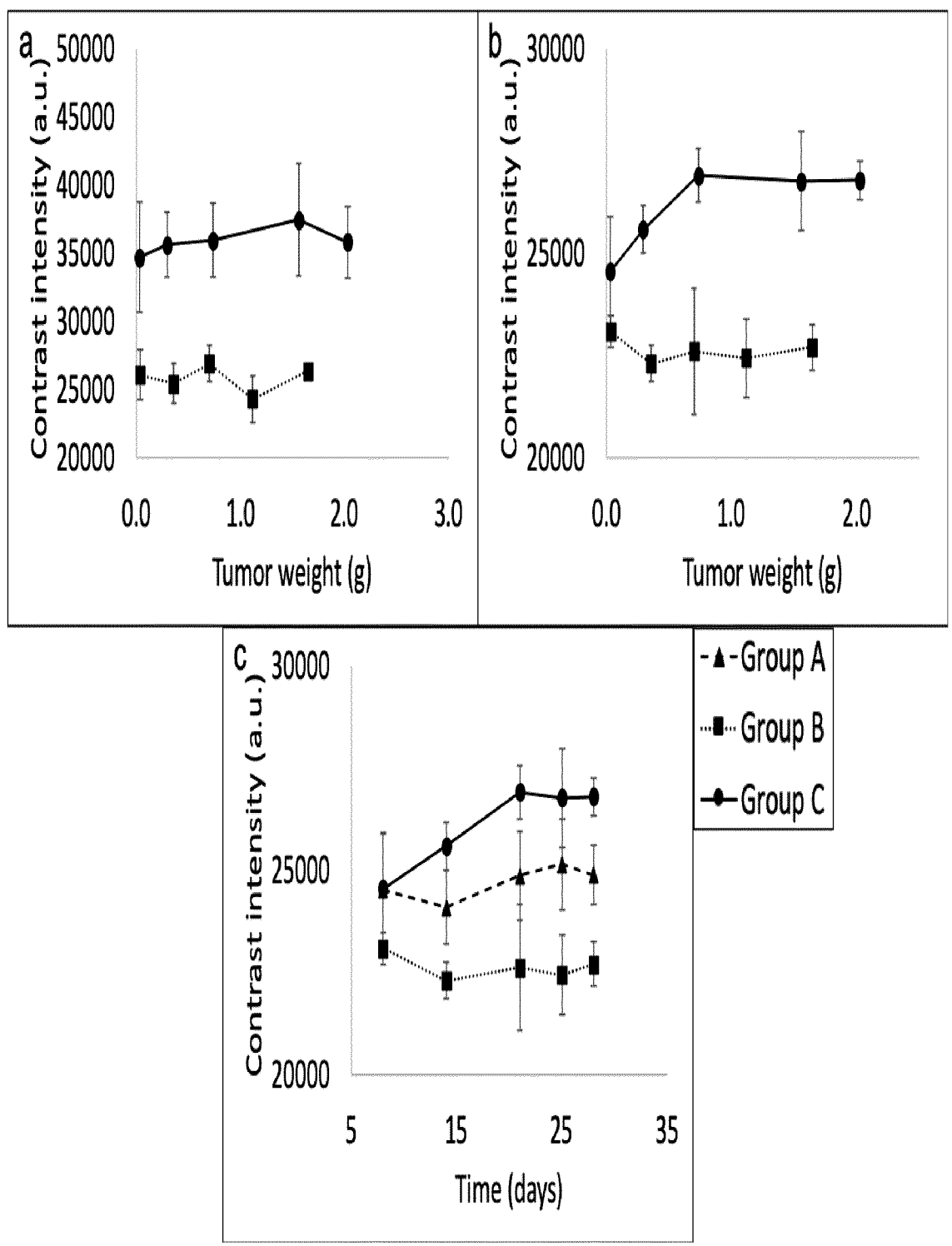

FIG: 5
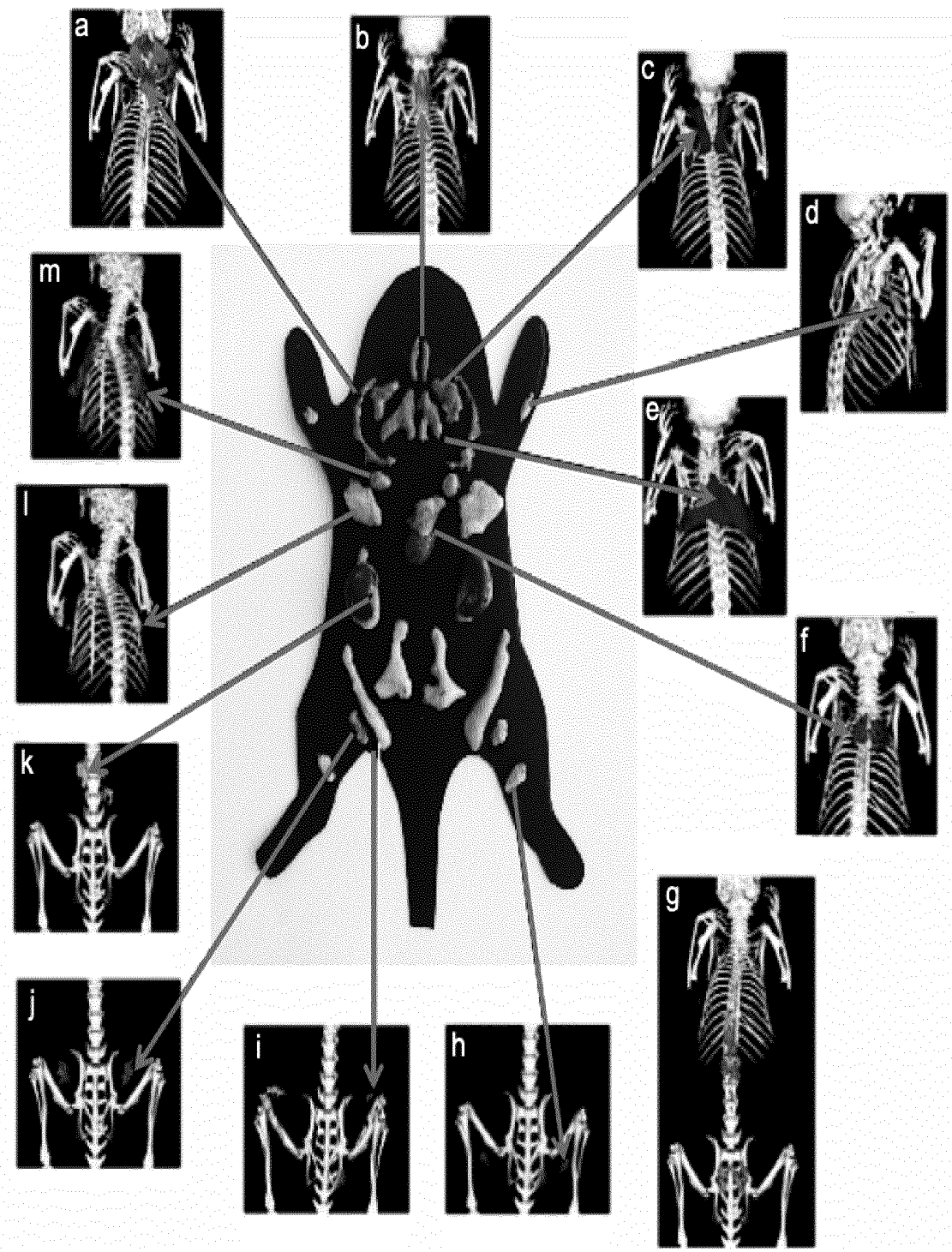

CT CONTRAST AGENT FOR DETECTION OF CACHEXIA

FIELD OF THE INVENTION

The invention relates to the diagnosis of cachexia or precachexia by computed tomography using a CT contrast agent.

BACKGROUND OF THE INVENTION

Cancer cachexia is a devastating, multifactorial and often irreversible syndrome that affects around 50-80% of cancer patients, depending on the tumour type, and that leads to substantial weight loss, primarily from loss of skeletal muscle and body fat. It is associated with reduced physical function, reduced tolerance to anticancer therapy, and reduced survival. Weight loss in patients with cancer is rarely recognised, assessed, or managed actively. It is well accepted that cachexia is indirectly responsible for the death of at least 20% of all cancer patients. Thus, cachexia diagnosis and treatment represent an important unmet need.

The incidence of the syndrome among cancer patients is very high, although it varies by tumour type; in patients with gastric or pancreatic cancer, the incidence is more than 80%, whereas approximately 50% of patients with lung, prostate or colon cancer are affected, and around 40% of patients with breast tumours or some leukaemias develop the syndrome. Patients with severe muscle wasting, ongoing catabolism, low performance status, and metastatic disease refractory to therapy are unlikely to have clinically important benefits from multimodal treatment intended to result in gain of lean tissue and function. At this stage, the goal of therapy is palliation of symptoms and reduction in distress for both patient and family. Against this spectrum, there would be merit in recognising and diagnosing the onset of cachexia so that interventions to reduce or delay its effects can be implemented.

Cancer cachexia is defined as a multifactorial syndrome characterised by an ongoing loss of skeletal muscle mass with or without loss of fat mass that cannot be fully reversed by conventional nutritional support and leads to progressive functional impairment. The pathophysiology is characterised by a negative protein and energy balance driven by a variable combination of reduced food intake and abnormal metabolism.

Although the understanding of cachexia has progressed over the past decade, a lack of a definition, diagnostic criteria, and classification has impeded advancement in both clinical trials and clinical practice. A generic definition for all types of cachexia in both adults and children has been proposed, but the associated diagnostic criteria are not cancer-specific and have not been validated. The condition is rarely recognized in clinical settings as weight loss is not routinely assessed and treatment is usually inadequate. Despite several attempts to classify and stage patients with cancer-induced cachexia, there are many methodologies being used in the clinical practice. In spite of the existence of different cachexia definitions and consensus, cachexia is still infrequently diagnosed. This is, in part, due to the lack of clear standardized cachectic diagnostic methods and markers. Although several blood biomarkers for cancer cachectic patients have been suggested, they are far from being universal and applicable to all patients. They include tumour derived compounds, inflammatory cytokines, acute phase proteins, and skeletal muscle degradation markers. Some of the clinical criteria used in the past include weight loss, decreased physical performance, fatigue, anorexia, and metabolic alterations.

The current consensus is that cachexia is diagnosed when a patient loses at least 5% or more body weight in 6 months or more than 2% of body weight with the body mass index below 20 or sarcopenia being present[1]. However, overweight and obese cancer patients are now prevalent in Westernized countries, and the marked shift in body weight renders the definition of clinically significant weight loss in patients with cancer increasingly unclear.

A condition called precachexia (or early cachexia) which precedes cachexia, characterized by early clinical and metabolic signs (e.g. anorexia and impaired glucose tolerance), can precede substantial involuntary weight loss (i.e., ≤5%). Precachexia is even harder to diagnose in a clinical setting.

A method of diagnosis of cachexia or precachexia would increase the possibilities of treatment, as diagnosis of cachexia in latter stages is refractory to treatment. Today there is a need in detecting adipose tissue changes in cachexia or precachexia. There is currently no diagnostic imaging used for adipose tissue composition and changes in cachexia or precachexia diagnosis. It is thus an object of the invention to overcome this major diagnostic need.

BRIEF DESCRIPTION OF THE INVENTION

One object of the invention is to provide a method of diagnosing cachexia or precachexia in a subject using a CT scan and an iodinated CT contrast agent that is able to detect changes in adipose tissues in patients suffering from cachexia or precachexia.

Cachexia is a complex wasting syndrome accompanying infectious disease such as tuberculosis and AIDS and chronic diseases such as chronic obstructive pulmonary disease, multiple sclerosis, chronic heart failure, chronic kidney disease, rheumatoid arthritis, Crohn's disease and most importantly cancer.

One of the objects of the present invention is to provide a method of diagnosing cachexia or precachexia in a subject, the method comprises the steps of:

a) in vivo imaging with Computed Tomography brown and/or beige adipose tissue (BAT) in said subject, comprising administering a contrast agent comprising a biocompatible formulation of iodinated fatty acids having 4 to 24 carbon atoms and/or esters and/or salts and/or mixtures thereof according to general formula I:

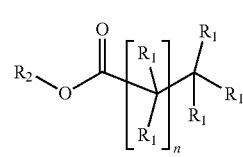

Formula I wherein n=2-22;
$R_1$ is H or I, with the provisions that the number of iodine atoms is 1 to 6, and that the iodine atoms are neither geminal nor vicinal;
and where R2 is H, unsaturated or saturated, linear or branched alkyls, alkyls, alkoxyalkyl, hydroxyalkoxyalkyl, polyhydroxyalkyl, hydroxy poly alkyleneoxyalkyl and generating a CT scan;

b) the obtained CT scan of step a) is then compared to a normal patient and diagnosis of cachexia or precachexia is performed by establishing positive or increased enhancement of BAT and/or beige adipose tissue or by detecting the white adipose tissue (WAT) browning and/or BAT activity in said subject.

Surprisingly said CT contrast agent is adapted for oral use (i.e. peroral) and intravenous route of administration.

Another object of the present invention is to provide a method of cachexia or precachexia diagnosis by Computed Tomography detection of brown and/or beige adipose tissue (BAT) in a subject, comprising administering orally a contrast agent comprising a biocompatible nano-emulsion of iodinated fatty acids having 4 to 24 carbon atoms and/or esters and/or salts and/or mixtures thereof according to general formula I (as defined above).

A further object is to provide a method of diagnosing a cancer which is responsible of developing a cachexia syndrome in a subject, the method comprises the steps of:
  a) in vivo imaging with Computed Tomography brown and/or beige adipose tissue (BAT) in said subject, comprising administering a contrast agent comprising a iodinated fatty acids having 4 to 24 carbon atoms and/or esters and/or salts and/or mixtures thereof according to general formula I as defined above,
  b) the obtained CT scan of step a) is then compared to a normal patient and diagnosis of a cancer which is responsible of developing a cachexia syndrome is performed by establishing positive or increased enhancement of BAT and/or beige adipose tissue or by detecting the white adipose tissue (WAT) browning and/or BAT activity in said subject.

Other objects and advantages of the invention will become apparent to those skilled in the art from a review of the ensuing detailed description.

BRIEF DESCRIPTION OF THE FIGURES

FIG. 1:
Representative pictures of the interscapular adipose tissue in mice from groups A (no tumor, contrast agent), B (tumor, no contrast agent) and C (tumor, contrast agent) at days 8 (1), 14 (2) and 28 (3) imaged by CT. White arrows point to the interscapular brown adipose tissue.

FIG. 2:
Representative pictures of the popliteal adipose tissue in mice from groups A (no tumor, contrast agent), B (tumor, no contrast agent) and C (tumor, contrast agent) at days 8 (1), 14 (2) and 28 (3) imaged by CT. The arrows point to the popliteal fat.

FIG. 3:
a: Evolution of the weight of the mice throughout the study. Group A: no tumor, contrast agent; group B: tumor, no contrast agent; group C: tumor, contrast agent. For groups B and C, the recorded weight has been corrected by subtracting tumor mass to avoid bias. b: Evolution of tumor mass in groups B and C.

FIG. 4:
Contrast enhancement of two different BAT areas (a: interscapular; b: popliteal) in mice. Group A: CT contrast agent, no tumor. Group B: no CT contrast agent, tumor; group C: CT contrast agent, tumor.
  a. Interscapular BAT: no contrast enhancement in relation with tumor growth is observed because this BAT area is activated in mice housed at 20-22° C.
  b. Popliteal adipose tissue: activation and browning, characterized by contrast enhancement and correlated with tumor growth, is observed.
  c. Popliteal adipose tissue: activation and browning as a function of time is observed in Group C.

FIG. 5:
Location of brown and beige adipose tissues in a mouse. Clockwise, starting top left: a: Collar BAT; b: Cervical BAT; c: Sub-scapular BAT; d: Triceps beige; e: Interscapular BAT; f: Cardiac beige; g: Perivascular beige; h: Popliteal beige; i: Inguinal beige; j: Groin beige; k: Perirenal beige; l: Axiliar beige; m: Axiliar BAT

DETAILED DESCRIPTION OF THE INVENTION

Cancer cachexia is a complex syndrome mainly characterized by body weight loss, muscle wasting, and metabolic abnormalities that affects 50-80% of cancer patients and accounts for about 20% of cancer deaths. Body weight loss mainly depends on wasting of skeletal muscle mass, which is considered the main hallmark of cancer cachexia. Also, systemic inflammation participates to the onset of cancer cachexia. The major symptoms include anorexia, anaemia, asthenia and fatigue, further impairing patient quality of life. In addition, cachexia is associated with decreased anticancer treatment tolerance and effectiveness, resulting in reduced survival[2].

Today, cachexia is diagnosed by measuring weight loss over a period of time. If the body weight loss exceeds 5% in 6 months, cachexia is diagnosed. However, several other diagnostic criteria exist which complicates diagnosis in a clinical setting.

In cachexia there is an energy balance disorder, in which energy intake is decreased and/or energy expenditure is increased[3]. The different contribution of the two components—intake or expenditure—of the energy balance depends on the tumour type and its growth phase. Although alterations of energy intake are often associated with cachexia, increased resting energy expenditure is a possible cause of the wasting syndrome.

Different types of molecular mechanisms contribute to energy expenditure and, therefore, involuntary body weight loss. First, increased futile cycle activity is observed and contributes to energetic inefficiency. Futile cycle takes place within the mitochondria and is responsible for the recycling of protons; this cycle could be activated in cancer as a consequence of uncoupling. Data from mouse cachectic Lewis lung carcinoma model suggests that mitochondrial ATP synthesis in skeletal muscle is decreased in cancer. Indeed, the proton electrochemical gradient between the external and internal mitochondrial membrane that drives mitochondrial ATP synthesis is disrupted through the activation of the so-called uncoupling proteins (UCPs)[4].

The activity of different UCPs has been shown to be increased in skeletal muscle (UCP2 and UCP3) and brown adipose tissue (BAT) (UCP1) in both experimental animals and human subjects affected by cachectic tumours. This phenomenon is linked with mitochondrial uncoupling of oxidative phosphorylation. UCP proteins, present in the inner membrane of the mitochondria, uncouples the respiratory chain, decreasing the production of ATP and dissipating the excess of protons gradient as heat.

More recently, adipocytes expressing UCP1 have been shown to be present in the white adipose tissue (WAT) and have been named beige adipocytes[3]. This question is of great interest as adult humans seem to have very little BAT whereas there are many inducible beige adipocytes in the subcutaneous WAT. Many studies demonstrated that the brown adipose tissue (BAT) and/or beige adipose tissue dissipates the excess of energy as heat, increasing the energy expenditure.

In cancer cachexia, skeletal muscle loss is usually accompanied by a profound change in white adipose tissue (WAT). The consistent dissolution of this white fat mass is the result of different altered processes, namely increase of lipolytic activity, decreased antilipolytic effect of insulin, decrease in the activity of lipoprotein lipase, and reduced de novo lipogenesis. Decreased lipolysis occurs together with a preservation of skeletal muscle mass, suggesting that the changes in adipose tissues precede that of skeletal muscle proteins and implying that some signal (or signals) generated during the breakdown of adipocyte triacylglycerols may actually be responsible for the activation of muscle proteolysis.

Weight loss is often accompanied by decreased muscle strength, fatigue, anorexia, low fat-free mass index, abnormal biochemistry (increased inflammatory biomarkers (C-reactive protein >5.0 mg/l), IL-6>4.0 pg/ml), anaemia (<12 g/dl), and low serum albumin (<3.2 g/dl)). Furthermore, decreased physical performance (total activity, handgrip strength, stairs climb, or 6-min walk distance) or biochemical tissue analysis (activation of proteolysis or apoptosis in skeletal muscle biopsies) have all been used in clinical practice and complicate the diagnosis of cachexia.[5]

Metabolic dysfunction and increased metabolic rate have been proposed as causative for cachexia but the underlying mechanisms are at present poorly characterized. Thermogenesis has been observed in a mouse tumor model and suggested to contribute to the hypermetabolic state of cachexia. Interscapular BAT is not the only thermogenic organ in mice and humans. Brown adipocytes can also be induced within WAT depots, a phenomenon termed WAT browning. Brown adipocytes induced in WAT, also known as "beige" or "brite" cells are derived from a precursor population distinct from both mature white and brown adipocytes.

Evidence suggests that, during cancer cachexia, WAT cells undergo a "browning" process in which they convert into brown adipose tissue-like cells (also called beige adipocytes). Browning is associated with increased expression of UCP1, which switches the use of mitochondrial electron transport from ATP synthesis to thermogenesis, resulting in increased lipid mobilization and energy expenditure. Tumour-derived compounds, such as the inflammatory mediator IL6—which may also be released by immune cells—and parathyroid hormone related protein, seem to be responsible for driving the expression of UCP1. Neutralization of PTHRP in mice bearing the Lewis lung carcinoma was able to block WAT browning and decrease the loss of muscle mass and strength[6]. Several studies using tumour-bearing animals report a clear activation of BAT by lipolysis during cancer cachexia, which results in energy uncoupling at the mitochondrial level and the release of heat. As BAT has a key role in thermogenesis and energy balance in rodents, it may potentially contribute to the energy wasting mentioned above, which occurs in cancer patients.

[18]FDG-PET is the dominant imaging modality to assess brown adipose tissue but suffers from several limitations. Although glucose is taken up upon BAT activation, it is not the preferred substrate. Therefore, glucose uptake measured by [18]FDG-PET could underestimate BAT activity. Furthermore, some pathological conditions such as insulin resistance in type 2 diabetes (T2D) and obesity could mitigate or bias the quantification of the BAT activity with [18]FDG-PET.

[18]FDG-PET also offers very low resolution and is not able to detect small depots of beige adipose tissue present in WAT.

Information about body composition in terms of skeletal muscle and adipose tissues can be made by a CT or MRI scan but these techniques do not allow distinction between BAT or beige adipose tissue and WAT.

Applicants have surprisingly found that measuring BAT and/or beige adipose tissue in a patient is a very powerful tool to diagnose cachexia or precachexia. Beige adipose tissue is increased in the early development of cachexia. The process is called browning of white adipose tissue, yielding beige adipose tissue.

Browning of white adipose tissues is an early indicator of cancer cachexia development. In the present invention the activity of BAT and especially the browning of WAT surprisingly helps in establishing an accurate diagnosis.

In the context of cachexia diagnosis, the imaging of brown and beige adipose tissues is not possible today because of lack of specific tracer. This makes is difficult to detect, image and monitor these tissues in vivo. Despite the fact that some areas on a CT scan can be defined as brown adipose tissue without the use of CT contrast agent, a non-expert will appreciate a considerable advance in detection limits, quantification and quality of brown or beige adipose tissue with the use of new generation of CT contrast agents. It is especially true when considering beige adipocytes that are scattered within the white adipose tissue and impossible to visualize without contrast agent.

Besides, among the various routes of administration, oral administration is considered to be the most acceptable and economical method. Injections are usually administered in a hospital setting as it requires an experienced professional to administer the contrast agent, especially intravenous (IV) injection and infusions. Typically, a patient will be asked to sign an "informed consent form" prior to having an IV CT exam which uses iodine contrast. Serious reactions, that may include breathing difficulty, swelling of the throat, or swelling of other parts of the body can occur following the injection of a contrast agent. These reactions can be more serious if not treated immediately. On the contrary, oral formulations are easier to administer, safe and achieve desired concentrations, thus making the peroral (PO) route an ideal choice.

Applicants provide a CT scan using a specific contrast agent that is of low contrast enhancement for BAT/beige adipose tissue in a normal subject. When the person or subject has cachexia or precachexia the scan reveals positive or increased enhancement which helps in establishing an early diagnosis.

In the context of the invention, a "CT scan" is an X-ray image made using a form of tomography in which a computer (including software) controls the motion of the X-ray source and detectors, processes the data, and produces the image.

The CT scan or image of said subject is then compared to the CT scan/image of a normal patient or subject and diagnosis is done by establishing a positive contrast enhancement of BAT activity and/or WAT browning. The contrast enhancement of positive BAT activity and/or WAT browning, characterized by higher contrast intensity and/or area, and/or volume indicates the progression of cachexia in a patient.

In an embodiment of the invention, the patient or subject can be tested several times to follow the progression of the condition and/or establish the stage of cachexia. Without being bound by theory, a patient is suffering from the syndrome (cachexia) because abnormal metabolic changes are occurring in the body (browning of WAT and/or activation of BAT). This is caused by combination of the tumor and the patient's immune system.

The benefit of the method is that cachexia can be detected early (earlier than by today's standard of care) through a single CT scan, where otherwise medical doctors need at least 6 months to establish the diagnosis.

Computed tomography (CT) contrast agents have seen incremental improvements over the last 20 years. Nevertheless, applicants have developed an iodinated CT contrast agent for specific detection of adipose tissue changes involved in cachexia. Advantageously, this contrast agent can be administered intravenously or perorally which is a breakthrough in CT imaging. Image resolution by CT is significantly enhanced compared to PET and is adequate for monitoring these metabolic changes.

The oral route is commonly used for administration of iodinated oils in order to treat goiter or in the case of a nuclear accident, but this route of administration has never been described as a mean of delivering a contrast agent for CT imaging of parenteral organs. Parenteral organs are organs located elsewhere in the body than the mouth and alimentary canal (digestive tract).

Using this iodinated CT contrast agent at preclinical or clinical level also allows for the evaluation of the level of browning of WAT and BAT activation, both hallmarks of cancer *cachexia*.

Radioactive $^{18}$F-deoxyglucose-PET is the dominant imaging modality to non-invasively assess BAT but it suffers from several limitations for detection of adipose tissue browning[7]. Glucose uptake measured by [18]FDG-PET could underestimate BAT and beige adipose tissue under physiological and pathophysiological conditions. Furthermore, some pathological conditions such as insulin resistance in type 2 diabetes could mitigate or bias the quantification of the BAT activity with [18]FDG-PET. Compared to PET, image resolution by CT is significantly better, the radiation dose could be reduced, and CT technology is more widely available in clinics worldwide.

Positron emission tomography-computed tomography (known as PET-CT) is a nuclear medicine technique which combines, in a single gantry, a positron emission tomography (PET) scanner and an X-ray computed tomography (CT) scanner, to acquire sequential images from both devices in the same session. The images are combined into a single superposed (co-registered) image. Thus, functional imaging obtained by PET, which depicts the spatial distribution of metabolic or biochemical activity in the body can be more precisely aligned or correlated with anatomic imaging obtained by CT scanning. Two- and three-dimensional image reconstruction may be rendered as a function of a common software and control system.

Although methods and materials similar or equivalent to those described herein can be used in the practice or testing of the present invention, suitable methods and materials are described below. All publications, patent applications, patents, and other references mentioned herein are incorporated by reference in their entirety. The publications and applications discussed herein are provided solely for their disclosure prior to the filing date of the present application. Nothing herein is to be construed as an admission that the present invention is not entitled to antedate such publication by virtue of prior invention. In addition, the materials, methods, and examples are illustrative only and are not intended to be limiting.

In the case of conflict, the present specification, including definitions, will control.

Unless defined otherwise, all technical and scientific terms used herein have the same meaning as is commonly understood by one of skill in art to which the subject matter herein belongs. As used herein, the following definitions are supplied in order to facilitate the understanding of the present invention.

The term "comprise" is generally used in the sense of include, that is to say permitting the presence of one or more features or components.

As used in the specification and claims, the singular forms "a", "an" and "the" include plural references unless the context clearly dictates otherwise.

As used herein the terms "subject" or "patient" are well-recognized in the art and are used interchangeably herein to refer to a mammal, including dog, cat, rat, mouse, monkey, cow, horse, goat, sheep, pig, camel, and, most preferably, a human. In some embodiments, the subject is a subject in need of a diagnosis or a subject with a diagnosed disease or disorder. However, in other embodiments, the subject can be a healthy subject. The term does not denote a particular age or sex. Thus, adult and newborn subjects, whether male or female, are intended to be covered.

The term "formulation" or "pharmaceutical formulation" encompasses solid formulations such as tablets, enteric coated tablets, controlled-release tablets, sustained-release tablets and capsules. It also encompasses liquid and semi-solid formulations such as solutions, suspensions, emulsions, topical preparations, suppositories, enemas, and parenteral formulations for injections and infusions.

The term "ethiodized oil", is a poppyseed oil used by injection as a radio-opaque contrast agent that is used to outline structures in radiological investigations. Ethiodized oil is composed of iodine combined with ethyl esters of fatty acids of poppyseed oil, primarily as ethyl monoiodostearate and ethyl diiodostearate. Despite the precise structure is unknown it is comprised within the definition of formula I.

The term "emulsion" is usually interpreted to refer to a colloidal system of droplets of one liquid dispersed in another liquid with which it is immiscible; such definition would only embrace systems of water and liquid lipid or its derivatives and not dispersions of solid lipids or their derivatives.

The term "nano-emulsion" is used herein to embrace colloidal systems of solid or liquid lipophilic active pharmaceutical ingredients in water; the precise physical form of the disperse particles of oil phase is not certain but the particles are probably solid, semi-solid or liquid. The average size of the nano-emulsion will be in the nanometer range, preferably below 1000 nm.

Nano-emulsions can be engineered as biocompatible and biodegradable systems whose characteristics make them suitable for pharmaceutical preparations for the oral or parenteral delivery of active pharmaceutical substances. The emulsion preparation method and composition used to obtain the nano-emulsion system is important for the formation and stability of the final nano-emulsion. Methods for nano-emulsion drug delivery system formulation can be classified according to formation energy requirements, nature of phase inversion and self-emulsification properties. Thus, these systems can be prepared by high or low emulsification energy methods.

High-energy approaches utilize sophisticated mechanical devices (microfluidizers, high pressure homogenizers or ultrasonic methods) that generate intense forces capable of forming very fine oil droplets and produce nano-emulsions with high kinetic energy. These methods have greater control over dispersion of particle sizes and are more flexible for the choice of composition. High energy methods also provide controls for stability, rheology, and color of the emulsion.

Low-energy methods involve complex interfacial hydrodynamic phenomena and depend on the system composition properties. These methods are more energy efficient as they utilize internal chemical energy of the system and require only gentle physical stirring for production of the nano-emulsions. These methods generally involve phase inversion emulsification and self-emulsification.

Nano-emulsions offer several advantages. Wettability and/or solubility of poor water-soluble drugs is enhanced. This has positive effects on pharmacokinetics and pharmacodynamics with efficient drug release with appropriate rate, prolonged efficacy and drug uptake control, they show low side effects and drug protection properties from enzymatic or oxidative processes. Additionally, the high flexibility of nano-emulsions includes also a variety of manufacturing process options and a combination of widely assorted components such as surfactants, liquid lipids or even drug-conjugates.

Pharmaceutical ingredients with poor solubility in aqueous media present significant challenges for efficient and high bioavailability. The inherent high intra- and inter-individual variability of absorption of oral lipophilic drug leads to inconsistent and unpredictable bioavailability and magnitude of the therapeutic effect. Therefore, effective strategies to assure a predictable, consistent, and reproducible bioavailability and therapeutic effect for lipid-based medications are needed. Different solutions to address this problem have been broadly studied, including the approaches of particle size reduction, prodrugs, salt forms, co-crystals, solid amorphous forms, cyclodextrin clathrates, and lipid-based drug delivery systems such as self-emulsifying systems and liposomes.

The terms "iodinated fatty acids" and "iodinated fatty acid esters" used in carrying the invention into effect can be straight or branched, saturated aliphatic carboxylic acids containing at least 4 and preferably not more than 24 carbon atoms in the molecule, such as iodinated stearic, palmitic, oleic, linoleic, linolenic, steridonic, arachidonic, elaindic, gondoic, erucic, docosatetraenoic, eicosapentaenoic or docosahexaenoic acid and similar, used alone or administered with each other or with small amounts of other fatty acids or their derivatives. They contain maximum number of iodine atoms as a consequence of hydroiodination reaction of natural or synthetic fatty acid alkene double bonds. The invention also encompasses "periodinated" fatty acids and/or esters thereof, this term refers to iodinated fatty acids and/or esters that possess the maximum possible amount of iodine atoms within their chemical structures. According to a particular embodiment of the invention periodinated fatty acids and/or esters thereof are preferred.

According to the present invention, pharmaceutically acceptable salts of the iodinated fatty acids compound of the invention are also encompassed. As used herein, the phrase "pharmaceutically acceptable salt" (also referred herein as "salt") refers to a salt that retains the biological effectiveness of the free acids of the iodinated fatty acids compound of the invention and that is not biologically or otherwise undesirable. The pharmaceutically acceptable salts of the iodinated fatty acids compound of general formula (I) are acid addition salts with pharmaceutically acceptable acids.

A desired salt may be prepared by any suitable method known in the art, including treatment of the free acid with an inorganic base, such as lithium hydroxide, sodium hydroxide, potassium hydroxide, calcium hydroxide, magnesium hydroxide, zinc hydroxide, or organic base, such as ammonium hydroxide, methylamine, dimethylamine, trimethylamine, diethylamine, trimethylamine, morpholine, piperazine, L-arginine, 4-phenyl-cyclohexylamine, benethamine, benzathine, betaine, hydrabamine, 4-(2-hydroxyethyl) morpholine, 1-(2-hydroxyethyl)-pyrrolidine, 1-(2-hydroxyethyl) piperazine, N-methylglucamine, N,N,N-trimethyl ethanolamine hydroxide, tromethamine and the like.

Generally, the salts are prepared by charging the free acid into an organic solvent such as a lower alkanol, symmetrical or asymmetrical ethers containing 2 to 10 carbon atoms, an alkyl ester, or mixtures thereof, and then treated with stoichiometric amounts or with an excess of the desired salt forming inorganic or organic base to form the corresponding salt. The salt is recovered by standard recovery techniques, for example, by evaporation of the solution, or by filtration of the desired salt from the mixture, or it can be precipitated by the addition of a solvent in which the salt is insoluble and recovered there from.

Examples of suitable inorganic and organic solvents for performing the various reactions include any inorganic or organic solvent that does not adversely affect the reactants or the resulting product, including halogenated solvents such as methylene chloride, chloroform, ether solvents such as diethyl ether, and other solvents such as tetrahydrofuran, dioxane, diglyme, cyclooctane, benzene or toluene, heptane, cyclohexane, aliphatic as well as cycloaliphatic and aromatic hydrocarbon solvents, water, aqueous solutions, mixed organic and inorganic solutions, ethyl acetate, propyl acetate and mixtures thereof.

Preferred inorganic cations comprised in the salts are lithium, sodium, potassium, rubidium, ammonium, calcium, magnesium, zinc and manganese.

In chemistry, the term "geminal" used herein refers to the relationship between two atoms or functional groups that are attached to the same atom.

The related term "vicinal" refers to the relationship between two functional groups that are attached to adjacent atoms. Currently it is almost impossible to synthetize iodinated fatty acids and/or esters thereof having iodine atoms attached to adjacent carbon atoms (i.e. vicinal). Because of steric hindrance, those molecules are unstable and cannot be used for the purpose of the present invention. However, it might be possible that in the future, the skilled in the art would find a technical solution to this problem. Thus, in case stable iodinated fatty acids and/or esters there of having iodine atoms in vicinal positions are provided, it is believed that those compounds will also be suitable in solving the technical problem of the present invention.

As used herein, the term "alkyl" includes any long or short chain, straight-chained or branched aliphatic saturated or unsaturated hydrocarbon group. The unsaturated alkyl groups may be mono- or polyunsaturated and include both alkenyl and alkynyl groups. Such groups may contain up to 40 carbon atoms. However, alkyl groups containing up to 10 eg. 8, more preferably up to 6, and especially preferably up to 4 carbon atoms are preferred.

The term "alkoxyl" represents —O-alkyl. An example of an alkoxyl is a C1-C6 alkoxyl, which represents a straight or branched alkyl chain having from one to six carbon atoms attached to an oxygen atom. Exemplary C1-C6 alkoxyl groups include methoxyl, ethoxyl, propoxyl, isopropoxyl, butoxyl, sec-butoxyl, t-butoxyl, pentoxyl, hexoxyl, and the like. C1-C6 alkoxyl includes within its definition a C1-C4 alkoxyl.

The term "aryl" as used herein refers to a carbocyclic or heterocyclic, aromatic, 5-14 membered monocyclic or polycyclic ring. Exemplary aryls include phenyl, naphthyl, anthryl, phenanthryl, thienyl, pyrrolyl, imidazolyl, pyrazolyl, furyl, isothiazolyl, furazanyl, isoxazolyl, thiazolyl, pyridyl, pyrazinyl, pyrimidinyl, pyridazinyl, triazinyl, benzo[b]thienyl, naphtho[2,3-b]thianthrenyl, isobenzofuranyl, chromenyl, xanthenyl, phenoxathienyl, indolizinyl, isoindolyl, indolyl, indazolyl, purinyl, isoquinolyl, quinolyl, phthalazinyl, naphthyridinyl, quinoxyalinyl, quinzolinyl, benzothiazolyl, benzimidazolyl, tetrahydroquinolinyl, cinnolinyl, pteridinyl, carbazolyl, beta-carbolinyl, phenanthridinyl, acridinyl, perimidinyl, phenanthrolinyl, phenazinyl, isothiazolyl, phenothiazinyl, and phenoxazinyl.

In organic chemistry, a "saturated" compound is a chemical compound that has a chain of carbon atoms linked together by single bonds. Alkanes are saturated hydrocarbons. An "unsaturated" compound is a chemical compound that contains carbon-carbon double bonds or triple bonds, such as those found in alkenes or alkynes, respectively. Saturated and unsaturated compounds need not consist only of a carbon atom chain. They can form straight chain, branched chain, or ring arrangements. They can have functional groups, as well. It is in this sense that fatty acids are classified as saturated or unsaturated. The amount of unsaturation of a fatty acid can be determined by finding its iodine number.

Unsaturated compounds are those in which addition reaction can be obtained. In a chain of carbons, such as a fatty acid, a double or triple bond will cause a kink in the chain. These kinks have macro-structural implications. Unsaturated fats tend to be liquid at room temperature, rather than solid, as the kinks in the chain prevent the molecules from packing closely together to form a solid; these fats are called oils.

The term "polyhydroxy" or polyhydric refers to chemical compound containing two or more hydroxyl groups per molecule.

It is an object of the present invention to provide for a method of diagnosing cachexia or precachexia in a subject, the method comprises the steps of:

a) in vivo imaging with Computed Tomography brown and/or beige adipose tissue (BAT) in said subject, comprising administering a contrast agent comprising a biocompatible formulation of iodinated fatty acids having 4 to 24 carbon atoms and/or esters and/or salts and/or mixtures thereof according to general formula I:

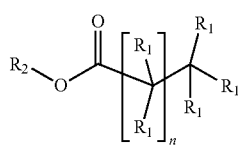

Formula I wherein n=2-22;
$R_1$ is H or I, with the provisions that the number of iodine atoms is 1 to 6, and that the iodine atoms are neither geminal nor vicinal;
and where R2 is H, unsaturated or saturated, linear or branched alkyls, alkyls, alkoxyalkyl, hydroxyalkoxyalkyl, polyhydroxyalkyl, hydroxy poly alkyleneoxyalkyl and generating a CT scan;

b) the obtained CT scan or image of step a) is then compared to a normal subject and diagnosis of cachexia or precachexia is performed by establishing positive or increased enhancement of BAT and/or beige adipose tissue or by detecting the white adipose tissue (WAT) browning and/or BAT activity in said subject.

The contrast enhancement in adipose tissues increases as the cachexia syndrome progresses in the subject demonstrating the ability to determine the cachexia stage according to the level of adipose tissue browning (see for FIG. 4c).

Establishment of positive or increased enhancement of BAT and/or beige adipose tissue or by detecting the white adipose tissue (WAT) browning and/or BAT activity in said subject is preferably determined according to Hounsfield Units, wherein the BAT and/or beige adipose tissue CT Hounsfield Units are in the range of −50 to 400 HU, preferably in the range of −50 to 100 HU and more preferably in the range of −50 to 0 HU.

BAT/beige fat in humans is usually in the −100 to −70 HU. Any enhancement above these values will allow positive diagnosis of cachexia. Obviously, it is known to the person skilled in the art that the final HU values will be dose dependent.

Surprisingly said CT contrast agent is adapted for oral (i.e. peroral) or intravenous route. Preferably the contrast agent is peroral.

Preferably, $R_2$ group may be mono or poly-substituted. Suitable $R_2$ groups can include but are not limited to a set of alkyl substituents such as methyl, ethyl, propyl, isopropyl, butyl, isobutyl, t-butyl, cyclopropylmethyl, pentyl, isopentyl, hexyl, isohexyl, heptly, isoheptyl, octyl, isooctyl, 2-propenyl, allyl, crotyl, 1-butenyl, 2-butenyl, butadienyl, ethynyl, 1-propynyl, 2-propynyl, 1-butynyl, 2-butynyl, 3-butynyl and propagyl, cyclopentyl, cyclohexyl, cycloheptyl, admantyl; aryls substituents such as phenyl, naphthyl, anisyl, toluyl, xylenyl, aryloxy, aralkyl, aralkyloxy, heteroaryl groups (pyrimidine, morpholine, piperazine, piperidine, thiophene), 1-cyclohexylpropyl, or haloalkyls substituents such as fluoromethyl, 1-fluoroethyl, 2-fluoroethyl, difluoromethyl, trifluoromethyl and pentafluoroethyl, chlorodimethyl, chloromethyl, 2-chloroethyl, 2,4-dichlorophenyl, 1,1,2,2-tetrachloroethyl, 1-chlorobutyl, and 4-chlorobenzyl.

It can include substituted alkyl groups such as 9-fluorenylmethyl, methoxyethoxymethyl, tetrahydropyranyl, pivalyloxymethyl, phenylacetoxymethyl, phenacyl and substituted phenacyl such as p-bromophenacyl, p-methoxyphenacyl, and also t-butyl, 3-methyl-3-pentyl, cyclopentyl, cycohexyl, allyl, 3-buten-1-yl, cinnamyl, oxazole, and 2-alkyl-1,3-oxazoline. It can also include alkylaryl such as benzyl, substituted benzyl such as triphenylmethyl, p-methoxybenzyl, 4-picolyl, dipohenylmethyl phenylethyl, substituted phenylethyl, but also alkoxyalkyl such as methoxymethyl, ethoxymethyl, propoxymethyl, butoxymethyl, methoxyethyl, ethoxyethyl, propoxyethyl, isopropoxyethyl, butoxyethyl, isobutoxyethyl, hydroxyalkoxyalkyl such as hydroxymethoxymethyl, 2-hydroxyethoxymethyl, 3-hydroxypropoxymethyl, 4-hydroxybuthoxymethyl, hydroxymethoxyethyl, hydroxymethoxypropyl hydroxymethoxybutyl, hydroxymethoxypentyl, hydroxymethoxyhexyl, polyhydroxyalkyl, and hydroxypolyalkyleneoxyalkyl.

The iodinated fatty acids having 4 to 24 carbon atoms and/or esters and/or salts and/or mixtures thereof according to general formula I comprises the following sub-formulae A, B, and C depending on the starting material used.

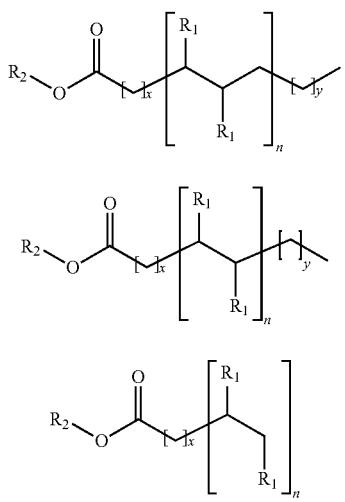

Formula A

Formula B

Formula C where n is an integer of 1-6, and x, y are carbon atoms in which x=0-20 and y=0-20 and x+y≤20 with the provision that the total number of carbon atoms in Formulae A, B or C respectively is ≤24; and where $R_2$ group may be mono or poly-substituted.

Thus suitable $R_2$ groups include for example unsubstituted alkyl, such as methyl, ethyl, propyl, isopropyl, butyl, isobutyl, pentyl, isopentyl, hexyl, isohexyl, heptyl, isoheptyl, octyl, isooctyl and similar but also substituted alkyl groups such as 9-fluorenylmethyl, methoxyethoxymethyl, tetrahydropyranyl, pivalyloxymethyl, phenylacetoxymethyl, phenacyl and substituted phenacyl such as p-bromophenacyl, p-methoxyphenacyl, and also t-butyl, 3-methyl-3-pentyl, cyclopentyl, cycohexyl, allyl, 3-buten-1yl, cinnamyl, oxazole, 2-alkyl-1,3-oxazoline and similar. It also includes alkylaryl such as benzyl, substituted benzyl such as triphenylmethyl, p-methoxybenzyl, 4-picolyl, dipohenylmethyl phenylethyl, substituted phenylethyl, but also alkoxyalkyl such as methoxymethyl, ethoxymethyl, propoxymethyl, butoxymethyl, methoxyethyl, ethoxyethyl, propoxyethyl, isopropoxyethyl, butoxyethyl, isobutoxyethyl, hydroxyalkoxyalkyl such as hydroxymethoxymethyl, 2-hydroxyethoxymethyl, 3-hydroxypropoxymethyl, 4-hydroxybuthoxymethyl, hydroxymethoxyethyl, hydroxymethoxypropyl hydroxymethoxybutyl, hydroxymethoxypentyl, hydroxymethoxyhexyl, polyhydroxyalkyl, hydroxypolyalkyleneoxyalkyl and similar groups.

The iodinated fatty acids having 4 to 24 carbon atoms and/or esters and/or mixtures thereof according to the invention may exist as isomeric mixtures or single isomers. If not specified both isomeric forms are intended. Where a compound of the invention contains one chiral centre, the iodinated compound can be provided as a single isomer (R or S) or as a mixture of isomers, for example a racemic mixture. Where an iodinated compound of the invention contains more than one chiral centre, the iodinated compound can be provided as an enantiomerically pure diastereoisomer or as a mixture of diastereoisomers.

In one embodiment, the iodinated fatty acids having 4 to 24 carbon atoms and/or esters and/or mixtures thereof according to the present invention has at least one asymmetric center. As a consequence of this asymmetric center, the iodinated compound of the present invention can occur in any of the possible stereoisomeric forms, and can be used in mixtures of stereoisomers, which can be optically active or racemic, or can be used alone as essentially pure stereoisomers, i.e., at least 95% pure. All asymmetric forms, individual stereoisomers and combinations thereof, are within the scope of the present invention.

According to an embodiment of the invention, the in vivo imaging with Computed Tomography of step a) is performed by PET-CT imaging, namely combining CT imaging with PET imaging.

Advantageously, a PET-CT scan combines a CT scan and a PET scan to combine the advantages of CT with PET to give the medical practitioner a better understanding of the anatomical localization of metabolically active tumors seen on PET scan. In a particular embodiment of the invention, PET-CT is preferred for in vivo imaging brown and/or beige adipose tissue (BAT) in a subject.

According to another embodiment, the biocompatible formulation is an ethiodized oil formulation.

According to a further embodiment of the invention, the biocompatible formulation is an emulsion. Preferably, the emulsion is a nano-emulsion.

According to yet another embodiment of the invention, the peroral contrast agent consisting in a biocompatible nano-emulsion of iodinated fatty acids having 4 to 24 carbon atoms and/or esters thereof can be used in a mixture comprising several or at least two iodinated fatty acids having different carbon chains of 4 to 24 carbon atoms.

In a preferred embodiment of the invention, the contrast agent consists in a biocompatible nano-emulsion of iodinated fatty acids having preferably 10 to 20 carbon atoms and more preferably 16 to 18 carbon atoms according to general formula I.

In an even preferred embodiment, the iodinated fatty acid is an iodinated linolenic acid.

Preferably the iodinated fatty acids are periodinated.

In particular, the nano-emulsion preferably comprises biocompatible emulsifiers selected among lecithin, polyethylene glycol ethers with fatty alcohols, polyethyleneglycol acids, polyoxyethylene sorbitol esters, sucrose stearates, sucrose esters, polysorbates and sorbitan esters or their mixtures. Lecithins, polysorbates (Tweens) and sorbitan esters (Spans) surfactants are preferred since they have a long and documented safe use in cosmetics, food products, and pharmaceutical formulations (oral, parenteral, and topical).

Preferably, the amount of the biocompatible emulsifiers in the nano-emulsion is between 5-30% (w/w) of the total nano-emulsion.

In an embodiment, the contrast agent for the diagnosis method of CT of the invention is adapted for non-invasive in vivo imaging, quantification, and/or monitoring of the activity of the brown and/or beige adipose tissue (BAT) in a subject.

In one embodiment, cachexia is a cancer cachexia.

In another embodiment of the invention, cachexia is a non-cancer cachexia associated with a disorder selected from the group consisting of HIV/AIDS, chronic kidney disease, chronic obstructive pulmonary disease (COPD), chronic heart failure, tuberculosis, Crohn's disease, chronic bowel disease, rheumatoid arthritis and geriatric cachexia.

In other embodiments, the method of the invention is adapted to diagnose early stages of cachexia in a subject suffering thereof. Preferably, the early diagnosis is done before the subject has lost more than 5% body weight. Alternatively, early diagnosis is done less than 6 months after the diagnosis of cancer.

According to a preferred embodiment, the peroral CT contrast agent of the method according to the invention is administrated at a dose corresponding to between 0.05 and 1.6 mg of iodine per gram of body weight.

However, in certain embodiments, the nano-emulsion may comprise, for example, at least about 0.01 mg of iodine per g of body weight of the peroral CT contrast agent of the invention. In other embodiments, the nano-emulsion may comprise between about 0.1% to about 75% of the weight of the unit, or between about 2% to about 20%, for example, and any range derivable therein.

In other non-limiting examples, a dose may also comprise from about 1 µg/kg/body weight, about 100 µg/kg/body weight, about 500 µg/kg/body weight, about 1 mg/kg/body weight, about 5 mg/kg/body weight, about 10 mg/kg/body weight, about 50 mg/kg/body weight, about 100 mg/kg/body weight, about 200 mg/kg/body weight, about 300 mg/kg/body weight, about 350 mg/kg/body weight, about 400 mg/kg/body weight, about 450 mg/kg/body weight, about 500 mg/kg/body weight, about 600 mg/kg/body weight, about 700 mg/kg/body weight, about 800 mg/kg/body weight, about 900 mg/kg/body weight, about 1000 mg/kg/body weight, about 2000 mg/kg/body weight to about 5000 mg/kg/body weight or more per administration, and any range derivable therein. In non-limiting examples of a derivable range from the numbers listed herein, a range of about 350 mg/kg/body weight to about 1000 mg/kg/body weight, about 50 µg/kg/body weight to about 500 mg/kg/body weight, and the like, can be administered.

In any case, the dose of the nano-emulsion that is to be used depends on the particular condition being diagnosed, the severity of the condition, the individual patient parameters including age, physical condition, size and weight, the duration of the imaging, the nature of concurrent therapy (if any) and other similar factors that are within the knowledge and expertise of the health practitioner. These factors are known to those of skilled in the art and can be addressed with minimal routine experimentation. Accordingly, the optimum dosage may be determined by the practitioner who is diagnosing any particular patient.

Indeed, the main substrate of brown or beige adipocytes is thought to be fatty acids more than glucose. It might also be the reason why the CT contrast agent is more taken up by brown or beige adipocytes when brown or beige adipose tissue are activated, meaning that one can obtain anatomical and functional information from the same CT scan. Other imaging methods for BAT or beige adipose tissue such as $^{18}$FDG-PET require activation of BAT, but the applicants observed that BAT and beige adipose tissues could be imaged with the use of the novel CT contrast agent without prior activation of these tissues.

Secondly, the resolution of CT is far better (between 10 and 100 micrometers) than the resolution of PET (in the order of 1 millimeter) allowing the precise delineation of beige depots within white adipose tissue. That last property is of particular importance because no imaging method until now was able to highlight the beige adipose tissue within the white adipose tissue with such an accuracy. Indeed, beige adipocytes will take up the contrast agent which will result in considerably enhancing the contrast between beige and white adipocytes. On the other hand, the contrast agent is not detected in white adipocytes.

To Applicant's knowledge, it is the first time that one can achieve this performance non-invasively and in vivo. It allows to precisely delineate small beige depots around the heart and vessels which is almost impossible with $^{18}$FDG-PET due to the spillover effect from the heart signal itself.

The present invention offers the possibility to non-invasively and precisely study the browning of subcutaneous adipose tissue, perivascular adipose tissue and cardiac adipose tissue. Applicants were also able to clearly identify in the mouse new beige depots which were poorly described until now, such as in the groin area or behind the knee in the popliteal area. Furthermore, Applicants were able to show a regionalization of the beige depot in different lobules within the inguinal fat pad.

Applicants also introduce the CT scan as a tool to monitor an indication of metabolic activity of a tissue, usually reserved to PET scan. Indeed, Applicants showed that conditions which activate brown or beige fat, such as low temperature or adrenergic activation via beta-3 receptors leads to an increase in the uptake of the CT contrast agent. More strikingly, Applicants also showed that the CT contrast agent of the invention, composed of fatty acids is detectable even in the condition of low brown adipose tissue activation which is really challenging with the use of PET given the acceptable limits of radiation exposure of volunteers. Fatty acids tracer for PET, such as $^{18}$F-fluoro-thiaheptadecanoic acid (18FTHA) was already tested for BAT imaging but seems to offer low signal in human.

Preparation:

It is understood that any suitable method for preparing the iodinated fatty acids having 4 to 24 carbon atoms and/or esters thereof of formula (I) known to the skilled in the art may be encompassed by the scope of the present invention.

Chemical Synthesis

Linear or branched unsaturated fatty acids or its derivatives of natural, semisynthetic or synthetic origin can be used as starting materials to yield iodinated molecules of interest. The number of double bonds can vary from 1-6.

Synthesis of Monoiodostearic Acid

Phosphorous pentoxide (170 mg, 1.0 mmol) was added slowly to orthophosphoric acid (1.0 mL) under magnetic stirring. Oleic acid (141 mg, 0.5 mmol) and sodium iodide (150 mg, 1.0 mmol) were added and the reaction mixture heated at 70° C. under reflux cooling. After 24 h the reaction mixture was cooled to ambient temperature and the acid separated from the crude product. Dichloromethane (20 mL) was added and the organic phase washed with sodium thiosulfate (0.1 M) until the organic phase becomes colourless. The organic phase was washed with brine and dried over sodium sulphate. The solvent was evaporated under reduced pressure giving colourless oil which was purified by Flash chromatography using dichloromethane/methanol gradient (181 mg, 0.44 mmol, 88% yield).

Synthesis of Ethyl Monoiodostearic Acid

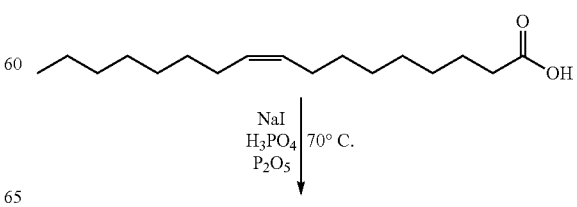

17
-continued

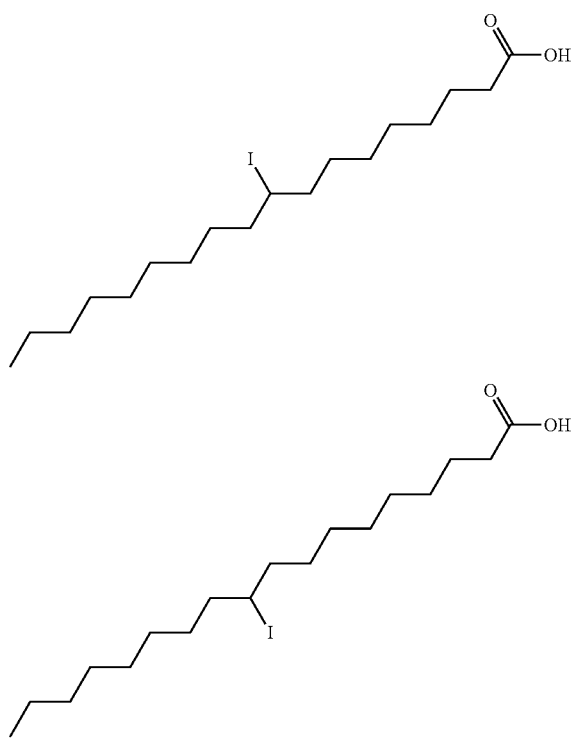

Ethyl oleate was synthesized according to published procedure[8]. Briefly, oleic acid (282 mg, 1 mmol), ethyl alcohol (170 mmol, 15 mL) and SnCl$_2$ (19 mg, 0.1 mmol were stirred at 60° C. After for 16 h the reaction mixture was cooled to ambient temperature and the solvent evaporated under reduced pressure. Dichloromethane (50 mL) was added and the organic phase washed with water, saturated solution of NaHCO$_3$ and brine. The organic phase was dried with Na$_2$SO$_4$ and the solvent evaporated under reduced pressure yielding colourless oil (282 mg, 95% yield).

Phosphorous pentoxide (170 mg, 1.0 mmol) was added slowly to orthophosphoric acid (1.0 mL) under magnetic stirring. Ethyl oleate (148 mg, 0.5 mmol) and sodium iodide (150 mg, 1.0 mmol) were added and the reaction mixture heated at 70° C. under reflux cooling. After 24 h the reaction mixture was cooled to ambient temperature and the acid separated from the crude product. Dichloromethane (20 mL) was added and the organic phase washed with sodium thiosulfate (0.1 M) until the organic phase becomes colourless. The organic phase was washed with brine and dried over sodium sulphate. The solvent was evaporated under reduced pressure giving colourless oil which was purified by Flash chromatography using dichloromethane/methanol gradient (170 mg, 0.39 mmol, 78% yield).

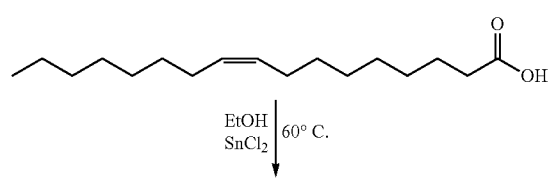

18
-continued

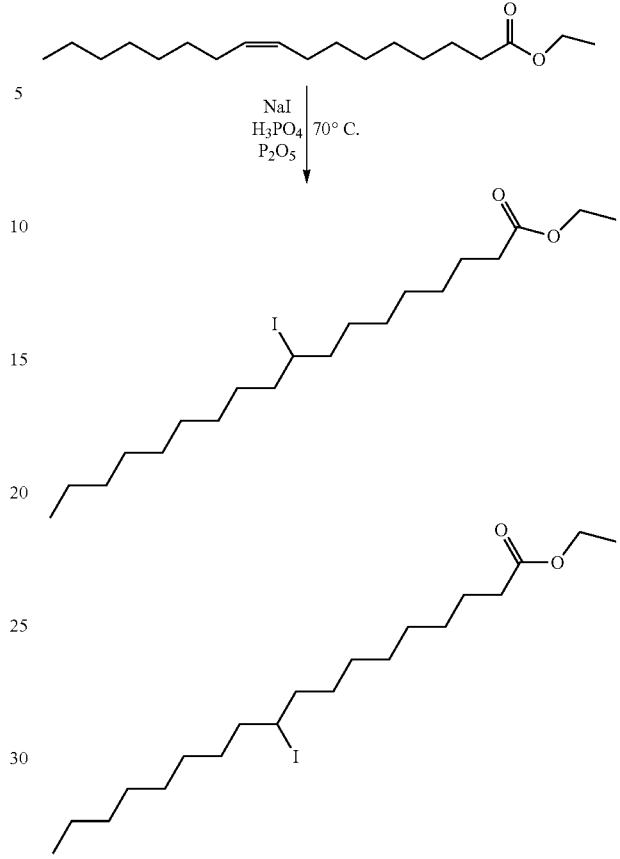

The described syntheses give structures with the following sub-formulae A, B, and C depending on the starting material used.

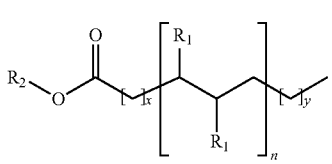

Formula A

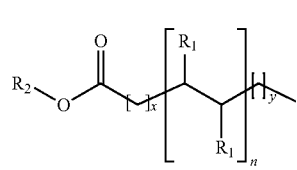

Formula B

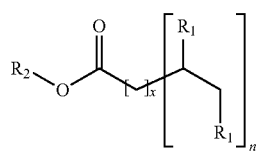

Formula C where n is an integer=1-6, and x=0-20 and y=0-20 and x+y≤20 with the provision that the total number of carbon atoms in Formulae A, B or C respectively is ≤24;
and where R$_2$ group may be mono or poly-substituted.

Preferably, R$_2$ groups can include but are not limited to set of alkyl substituents such as methyl, ethyl, propyl, isopropyl, butyl, isobutyl, t-butyl, cyclopropylmethyl, pentyl, isopentyl, hexyl, isohexyl, heptly, isoheptyl, octyl, isooctyl, 2-propenyl, allyl, crotyl, 1-butenyl, 2-butenyl, butadienyl, ethynyl, 1-propynyl, 2-propynyl, 1-butynyl, 2-butynyl, 3-butynyl and propagyl, cyclopentyl, cyclohexyl, cycloheptyl, admantyl; aryls substituents such as phenyl, naphthyl, anisyl, toluyl, xylenyl, aryloxy, aralkyl, aralkyloxy, heteroaryl groups (pyrimidine, morpholine, piperazine, piperidine, thiophene), 1-cyclohexylpropyl, or haloalkyls substituents such as fluoromethyl, 1-fluoroethyl, 2-fluoroethyl, difluoromethyl, trifluoromethyl and pentafluoroethyl, chlorodimethyl, chloromethyl, 2-chloroethyl, 2,4-dichlorophenyl, 1,1,2,2-tetrachloroethyl, 1-chlorobutyl, and 4-chlorobenzyl.

It can also include substituted alkyl groups such as 9-fluorenylmethyl, methoxyethoxymethyl, tetrahydropyranyl, pivalyloxymethyl, phenylacetoxymethyl, phenacyl and substituted phenacyl such as p-bromophenacyl, p-methoxyphenacyl, and also t-butyl, 3-methyl-3-pentyl, cyclopentyl, cycohexyl, allyl, 3-buten-1-yl, cinnamyl, oxazole, and 2-alkyl-1,3-oxazoline.

It can also include alkylaryl such as benzyl, substituted benzyl such as triphenylmethyl, p-methoxybenzyl, 4-picolyl, dipohenylmethyl phenylethyl, substituted phenylethyl, but also alkoxyalkyl such as methoxymethyl, ethoxymethyl, propoxymethyl, butoxymethyl, methoxyethyl, ethoxyethyl, propoxyethyl, isopropoxyethyl, butoxyethyl, isobutoxyethyl, hydroxyalkoxyalkyl such as hydroxymethoxymethyl, 2-hydroxyethoxymethyl, 3-hydroxypropoxymethyl, 4-hydroxybuthoxymethyl, hydroxymethoxyethyl, hydroxymethoxypropyl hydroxymethoxybutyl, hydroxymethoxypentyl, hydroxymethoxyhexyl, polyhydroxyalkyl, and hydroxypolyalkyleneoxyalkyl.

Nano-Emulsion:

Formulation optimization was done by experimental design. Several parameters have been assessed, including active CT ingredient, excipient(s) type and quantity, their compatibility, and method of preparation. The optimal formulation choice was based on physicochemical properties, stability and biocompatibility.

Oil-in-water nano-emulsions were prepared in order to dissolve the iodinated fatty acids in water, which will improve their intestinal absorption. The emulsion formulation was improved in order to reach the fastest and the most complete absorption of the contrast agent. The aim of this last step is to reach the highest enhancement with the lower possible dose. Then, the contrast agent was tested in different conditions of brown fat activation in order to show its potential in the evaluation of the brown fat metabolism.

The following characteristics are to be achieved:
O/W nano-emulsion
Minimal amount of emulsifiers
Low viscosity
Biocompatibility (non-toxic and non-irritating at required doses)
Prolonged stability of nano-emulsions upon storage at 4° C.
Materials and process cost effectiveness The proposed short-list of preferred excipients and their mixtures have been tested:
Polysorbates (Tween) 20, 40, 60, 80
Sorbitan esters (Span) 20, 40, 60, 80, 85
Polyoxyethylene fatty alcohol ethers (Brij) O10, S10, S20, 30, 35, 52, 58, 72, 78, 92, 98,99, S100
Polyoxyethylene stearates
Lecithins
Alkyl polyglycosides
Caprylocaroyl macrogol-8 glycerides
Cetomacrogol 1000
Cetostearyl alcohol
Cetyl alcohol
Cocamide MEA
Cocamide DEA
Decyl glucoside
Decyl polyglucose
Glycerol monostearate
Isoceteth-20
Lauryl glucoside
Maltosides
Monolaurin
Mycosubtilin
Nonidet P-40
Nonoxynol-9
Nonoxynols
NP-40
Octaethylene glycol monododecyl ether
N-Octyl beta-D-thioglucopyranoside
Octyl glucoside
Oleyl alcohol
PEG-10 sunflower glycerides
PEG-12 octylphenyl ether
PEG-12 tridecyl ether
PEG-18 tridecyl ether
PEG-40 castor oil
PEG-40 sorbitan peroleate
PEG-PPG-PEG Pluronic® L-64
Pentaethylene glycol monododecyl ether
Polidocanol
Poloxamer
Poloxamer 407
Polyethoxylated tallow amine
Polyglycerol polyricinoleate
Sorbitan tristearate
Stearyl alcohol
Sucrose laurate
Sucrose palmitate
Surfactin
Triton X-100

Lecithins, polysorbates (Tweens) and sorbitan esters (Spans) surfactants are preferred since they have a long and documented safe use in cosmetics, food products, and pharmaceutical formulations (oral, parenteral, and topical).

The fatty acid or its derivative (dissolved in an organic solvent or neat) can be added to ion-free water or buffer, preferably containing an emulsifier, with vigorous agitation at a temperature above the melting point of the fatty acid, to produce a finely dispersed oil-in-water emulsion. Agitation may be effected by any known means, e.g. by the use of a high shear agitator or ultrasonically. The water phase can contain other excipients such as preservatives (such as antimicrobial and/or antioxidants), stabilizers, texture-modifiers, colorants, taste-modifying agents, pharmaceutically acceptable salts and/or buffering agents.

The amount of iodinated fatty acid or its derivatives should be at least 10% and preferably at least 20% by weight of the concentrated emulsion; a content of 30% is generally preferred, but emulsions as concentrated as 40% can be prepared in some cases. A small amount of an emulsifying agent is preferably included in the composition.

When an emulsifier is used, the viscosity of the emulsion will vary with the water/oil phase ratio and usually passes through a maximum value as the water/fatty acid ratio is increased. In order to obtain a fine emulsion it is preferable to agitate for a time with the water/fatty acid ratio near to or slightly in excess of that required for maximum viscosity and then add further ion-free water with continued agitation to give the desired iodinated fatty acid concentration. The emulsion is then allowed to cool to room temperature.

It is another object of the present invention to provide a formulation comprising an iodinated fatty acids having 4 to 24 carbon atoms and/or esters and/or salts and/or mixtures thereof according to general formula I (as defined above):

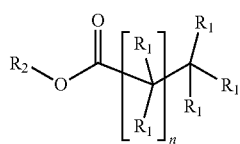

Formula I wherein n=2-22;
$R_1$ is H or I, with the provisions that the number of iodine atoms is 1 to 6, and that the iodine atoms are neither geminal nor vicinal;
and where $R_2$ is H, unsaturated or saturated, linear or branched alkyls, alkyls, alkoxyalkyl, hydroxyalkoxyalkyl, polyhydroxyalkyl, hydroxy poly alkyleneoxyalkyl;
for use as a non-invasive peroral Computed Tomography contrast agent for in vivo imaging the brown and/or beige adipose tissue in a subject and then diagnosing cachexia or precachexia in a patient.

In particular, the contrast agent of the invention consists in a biocompatible nano-emulsion of iodinated fatty acids having preferably 10-20 carbon atoms and more preferably 16 to 18 carbon atoms according to general formula I. In an even preferred embodiment, the iodinated fatty acid is an iodinated linolenic acid.

As defined above, the nano-emulsion preferably comprises biocompatible emulsifiers selected among lecithin, polyethylene glycol ethers with fatty alcohols, polysorbates and sorbitan esters or their mixtures.

In another embodiment, cancer is the leading cause of death in developed and developing countries. Cancer mortality is expected to rise to an estimated 13.1 million deaths annually by 2030. However, certain types of cancer have a high chance of cure if they are detected at an early stage and adequately treated. Early diagnosis of cancer generally increases the chances for successful treatment by focusing on detecting symptomatic patients as early as possible.

Delays in accessing cancer care are common with late-stage presentation, particularly in lower resource settings and vulnerable populations. The consequences of delayed or inaccessible cancer care are lower likelihood of survival, greater morbidity of treatment and higher costs of care, resulting in avoidable deaths and disability from cancer. Early diagnosis improves cancer outcomes by providing care at the earliest possible stage and is therefore an important public health strategy in all settings. Despite this almost half of cancer diagnoses happen when the patient reports to the hospital with acute symptoms of advanced cancer.

Cancer is usually diagnosed in late stage II around the time that it begins to spread to surrounding lymph nodes and other organs. The cost of this late diagnosis is significant. The odds of survival can be 4-7× higher for cancers that are diagnosed in stage I rather than in stage II, however they are cancer-type dependent.

What is common among all cancers is the development of cachexia over the course of the disease. While cachexia may appear in all types of cancers, some are more likely to develop this syndrome than others[9]. Generally speaking, cancer types can be divided in three categories depending on their propensity to cause cachexia: cancers with high cachexia prevalence (≥80% of cancer patients); cancers with intermediate cachexia prevalence (50-80% of cancer patients); and cancer with low cachexia prevalence (<50% of cancer patients). High cachexia prevalence is found in gastric, hepatic and pancreatic cancer. Lung (small cell and non-small cell), colorectal, prostate and head and neck cancers show intermediate cachexia prevalence. Cancers with low cachexia prevalence are non-Hodgkin's lymphoma, sarcoma, acute non-lymphocytic leukemia and breast cancer.

Interestingly, cancers which are commonly diagnosed in late stage III or IV (lung, pancreatic, gastric, esophagus, head & neck cancer) also have high or intermediate cachexia prevalence among cancers.

Thus, a further object of the invention is to provide a method of diagnosing a cancer which is responsible of developing a cachexia syndrome in a subject, the method comprises the steps of:
a) in vivo imaging with Computed Tomography brown and/or beige adipose tissue (BAT) in said subject, comprising administering a contrast agent comprising a iodinated fatty acids having 4 to 24 carbon atoms and/or esters and/or salts and/or mixtures thereof according to general formula I.

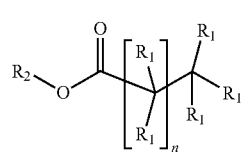

Formula I wherein n=2-22;
$R_1$ is H or I, with the provisions that the number of iodine atoms is 1 to 6, and that the iodine atoms are neither geminal nor vicinal;
and where $R_2$ is H, unsaturated or saturated, linear or branched alkyls, alkyls, alkoxyalkyl, hydroxyalkoxyalkyl, polyhydroxyalkyl, hydroxy poly alkyleneoxyalkyl and generating a CT scan;
b) the obtained CT scan or image of step a) is then compared to a normal subject and diagnosis of a cancer which is responsible of developing a cachexia syndrome is performed by establishing positive or increased enhancement of BAT and/or beige adipose tissue or by detecting the white adipose tissue (WAT) browning and/or BAT activity in said subject.

A cancer responsible for developing the cachexia syndrome is usually any cancer releasing tumor factors and/or pro-inflammatory chemokines and/or cytokines which cause remodeling and/or browning and/or wasting of adipose tissues and/or muscles. The patient's immune system response to cancer chronic inflammation can result in similar changes of adipose tissues and/or muscles.

Preferably a cancer which is responsible of developing a cachexia syndrome in a subject is a cancer with high cachexia prevalence.

More preferably the cancer which is responsible of developing a cachexia syndrome is selected from the list consisting of lung cancer, pancreatic cancer, liver cancer, colon cancer, gastric cancer, prostate cancer, breast cancer, esophageal, head and neck, ovarian cancer, cervical cancer, or sarcoma.

Surprisingly said CT contrast agent is adapted for oral (i.e. peroral) or intravenous route. Preferably the contrast agent is peroral.

According to an embodiment of the invention, the contrast agent is an ethiodized oil formulation.

According to a further embodiment of the invention, the contrast agent is a biocompatible formulation and preferably an emulsion. Most preferably, the emulsion is a nano-emulsion.

According to yet another embodiment of the invention, the contrast agent consists in a biocompatible nano-emulsion of iodinated fatty acids having 4 to 24 carbon atoms and/or esters thereof which can be used in a mixture comprising several or at least two iodinated fatty acids having different carbon chains of 4 to 24 carbon atoms. Preferably, the contrast agent is a biocompatible nano-emulsion of iodinated fatty acids having 4 to 24 carbon atoms according to general formula I.

According to an embodiment of the invention, the in vivo imaging with Computed Tomography of step a) is performed by PET-CT imaging, namely combining CT imaging with PET imaging.

Kits comprising the Computed Tomography contrast agent of the invention are also envisioned.

In addition, solid forms comprising the Computed Tomography contrast agent mixed with suitable excipients such as gelatin, polylactic acid, polylactic-polyglycolic acid, poloxamers, caprolactones, celluloses, sugar derivatives, etc. are also envisioned.

Another object of the present invention is to provide a method for preventing and/or treating a subject suspected of suffering or suffering from cachexia or precachexia, said method comprising the steps of:
a) administrating to said subject the Computed Tomography contrast agent of the invention consisting of a biocompatible nano-emulsion of iodinated fatty acids having 4 to 24 carbon atoms and/or esters and/or salts and/or mixtures thereof according to general formula I:

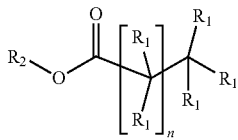

Formula I where n=2-22;
$R_1$ is H or I, with the provisions that the number of iodine atoms is 1 to 6, and that the iodine atoms are neither geminal nor vicinal;
and where $R_2$ is H, unsaturated or saturated, linear or branched alkyls, alkoxyalkyl, hydroxyalkoxyalkyl, polyhydroxyalkyl, hydroxy poly alkyleneoxyalkyl.
b) and subsequently administering to said subject or patient the adapted therapy depending on the outcome of the in vitro imaging of step a) performed on said subject suspected of suffering or suffering from cachexia or precachexia.

The therapeutic approach to treat cachexia or early *cachexia* is multimodal. Depending on the cachexia patient and the stage of cachexia it consists of specialized nutrition with high protein content; and/or nutraceuticals containing polyunsaturated fatty acids and/or fish oils and/or vitamin D and/or branched amino acids; and/or physical exercise programs; and/or therapies for appetite stimulation (megestrol acetate) and/or reducing inflammation by corticosteroids, or nonsteroidal anti-inflammatory drugs (NSAIDs) and/or novel appetite-enhancing anabolic ghrelin agonists (such as anamorelin).

It is yet a further object of the present invention to provide a method for diagnosing obesity in a subject, said method comprising the steps of:
a) in vivo imaging with Computed Tomography brown and/or beige adipose tissue (BAT) in said subject, comprising administering the contrast agent of the invention (as described above),
b) the obtained CT scan or image of step a) is then compared to a normal subject and diagnosis of obesity is performed by establishing negative or decreased enhancement of BAT and/or beige adipose tissue or by detecting decreased white adipose tissue (WAT) browning and/or BAT activity in said subject.

While normal brown adipose tissue (BAT) is present in most adults, the activity and/or quantity of brown adipose tissue is reduced in subjects who are overweight or obese. Brown adipose tissue is metabolically important in men, and the fact that it is reduced yet present in most overweight or obese subjects may make it a target for novel treatments of obesity.

Those skilled in the art will appreciate that the invention described herein is susceptible to variations and modifications other than those specifically described. It is to be understood that the invention includes all such variations and modifications without departing from the spirit or essential characteristics thereof. The invention also includes all of the steps, features, compositions and compounds referred to or indicated in this specification, individually or collectively, and any and all combinations or any two or more of said steps or features. The present disclosure is therefore to be considered as in all aspects illustrated and not restrictive, the scope of the invention being indicated by the appended Claims, and all changes which come within the meaning and range of equivalency are intended to be embraced therein.

The foregoing description will be more fully understood with reference to the following Examples. Such Examples, are, however, exemplary of methods of practicing the present invention and are not intended to limit the scope of the invention.

EXAMPLES

Example 1: Synthesis of 9(10)-iodooctadecanoic acid

Phosphorous pentoxide (170 mg, 1.0 mmol) was added slowly to orthophosphoric acid (1.0 mL) under magnetic stirring. Oleic acid (141 mg, 0.5 mmol) and sodium iodide were added and the reaction mixture heated at 70° C. under reflux cooling. After 24 h the reaction mixture was cooled to ambient temperature and the acid separated from the crude product. Dichloromethane (20 mL) was added and the organic phase washed with sodium thiosulfate (0.1 M) until the organic phase becomes colourless. The organic phase was washed with brine and dried over sodium sulphate. The solvent was evaporated under reduced pressure giving colourless oil which was purified by Flash chromatography using dichloromethane/methanol gradient (181 mg, 0.44 mmol, 88% yield). $^1$H NMR (600 MHz, CDCl$_3$) δ 4.07-4.02 (m, 1H), 2.28 (t, J=7.5 Hz, 2H), 1.78 (m, 2H), 1.60 (m, 4H), 1.45 (m, 2H), 1.36-1.16 (m, 22H), 0.81 (t, J=7.0 Hz, 3H). LRMS (ESI): m/z calculated for [M+K]$^+$ 449.1, found 448.1.

Example 2: Synthesis of 9(10), 12(13)-diiodooctadecanoic acid

Phosphorous pentoxide (340 mg, 2.0 mmol) was added slowly to orthophosphoric acid (2.0 mL) under magnetic stirring. Linoleic acid (280 mg, 1.0 mmol) and sodium iodide (500 mg, 3.33 mmol) were added and the reaction mixture heated at 70° C. under reflux cooling. After 24 h the reaction mixture was cooled to ambient temperature and the acid separated from the crude product. Dichloromethane (20 mL) was added and the organic phase washed with sodium thiosulfate (0.1 M) until the organic phase becomes colourless. The organic phase was washed with brine and dried over sodium sulphate. The solvent was evaporated under reduced pressure giving colourless oil which was purified by Flash chromatography using dichloromethane/methanol gradient (407 mg, 0.76 mmol, 76% yield). $^1$H NMR (600 MHz, CDCl$_3$) δ 4.15-4.07 (m, 2H), 2.41-2.34 (m, 2H), 2.11-2.02 (m, 2H), 1.96-1.82 (m, 2H), 1.76-1.62 (m, 4H), 1.58-1.50 (m, 2H), 1.46-1.23 (m, 16H), 0.95-0.88 (m, 3H). LRMS (ESI): m/z calculated for [M+Na]$^+$ 559.0, found 558.9.

Example 3: Synthesis of ethyl 16-iodohexadecanoate

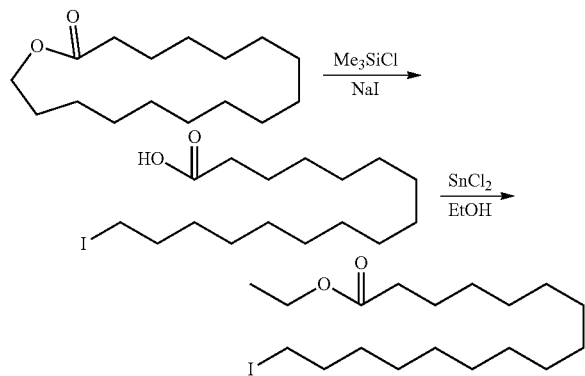

Example 4: Synthesis of 16-iodohexadecanoic acid 16-hexadecanolide (2.00 g, 7.86 mmol, 1 eq), sodium iodide (3.54 g, 23.6 mmol, 3 eq), chlorotrimethylsilane (2.99 mL (2.56 g), 23.6 mmol, 3 eq) and acetonitrile (25 mL, c=0.31 M) were stirred at reflux under nitrogen atmosphere overnight. Water (20 mL) and ether (50 mL) were added to the reaction mixture. The organic phase was washed with water, sodium thiosulfate, saturated brine and dried over sodium sulfate. The organic phase was filtered off and evaporated under reduced pressure to obtain a white solid (2.88 g, 7.53 mmol, 96% yield). $^1$H NMR (600 MHz, CDCl$_3$) δ 3.19 (t, J=7.1 Hz, 2H), 2.35 (t, J=7.5 Hz, 2H), 1.82 (p, J=7.1 Hz, 2H), 1.63 (p, J=7.5 Hz, 2H), 1.43-1.19 (m, 23H). $^{13}$C NMR (151 MHz, CDCl$_3$) δ 179.62, 34.09, 33.72, 30.66, 29.77, 29.75, 29.73, 29.69, 29.57, 29.39, 29.21, 28.70, 24.83, 7.71.

Example 5: Synthesis of ethyl 16-iodohexadecanoate 16-iodohexadecanoic acid (100 mg, 0.262 mmol, 1 eq), tin (II) chloride (19.8 mg, 0.105 mmol, 0.4 eq) and ethanol (5 mL, c=0.052 M) were stirred under nitrogen atmosphere overnight at reflux. The reaction mixture was evaporated under reduced pressure. The crude was purified by flash chromatography using cyclohexane/ether gradient to obtain a white solid (94.0 mg, 0.229 mmol, 88% yield). ESI MS 433.2 [M+Na]$^+$. $^1$H NMR (600 MHz, CDCl$_3$) δ 4.12 (m, J=7.1 Hz, 2H), 3.19 (t, J=7.1 Hz, 2H), 2.28 (t, J=7.6 Hz, 2H), 1.82 (p, J=7.1 Hz, 2H), 1.61 (p, J=7.4 Hz, 2H), 1.45-1.19 (m, 23H). $^{13}$C NMR (151 MHz, CDCl$_3$) δ 174.10, 60.31, 34.56, 33.72, 30.66, 29.78, 29.75, 29.74, 29.69, 29.60, 29.57, 29.42, 29.30, 28.70, 25.15, 14.41, 7.66.

Example 6: Synthesis of ethyl 12-iodododecanoate

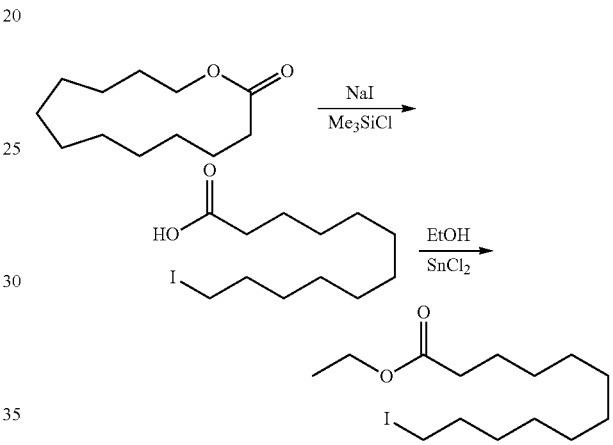

Example 7: Synthesis of 12-iodohexadecanoic acid

Oxacyclotridecan-2-one (1.00 g, 5.00 mmol, 1 eq) 16-hexadecanolide (2.00 g, 7.86 mmol, 1 eq), sodium iodide (2.25 g, 15.0 mmol, 3 eq) and chlorotrimethylsilane (1.90 mL (1.63 g), 15.0 mmol, 3 eq) and acetonitrile (25 mL, c=0.31 M) were stirred at reflux under nitrogen atmosphere overnight. Water (20 mL) and ether (50 mL) were added to the reaction mixture. The organic phase was washed with water, sodium thiosulfate, saturated brine and dried over sodium sulfate. The organic phase was filtered off and evaporated under reduced pressure to obtain a light yellowish solid (1.62 g, 4.97 mmol, 98% yield). ESI MS 325.2 [M−H]$^−$. $^1$H NMR (600 MHz, CDCl$_3$) δ 3.19 (t, J=7.0 Hz, 2H), 2.35 (t, J=7.5 Hz, 2H), 1.82 (p, J=7.1 Hz, 2H), 1.63 (p, J=7.5 Hz, 2H), 1.44-1.22 (m, 14H). $^{13}$C NMR (151 MHz, CDCl$_3$) δ 179.47, 34.06, 33.70, 30.64, 29.59, 29.52, 29.50, 29.35, 29.18, 28.67, 24.82, 7.71.

Example 8: Synthesis ethyl 12-iodododecanoate 12-iodohexadecanoic acid (800 mg, 2.45 mmol, 1 eq), tin (II) chloride (200 mg, 1.05 mmol, 0.4 eq) and ethanol (50 mL, c=0.052 M) were stirred under nitrogen atmosphere overnight at reflux. The reaction mixture was evaporated under reduced pressure. The crude was purified by flash chromatography using cyclohexane/ether gradient to obtain a white solid (1.06 g, 2.58 mmol, 66% yield). ESI MS 355.1 [M+H]$^+$. $^1$H NMR (600 MHz, CDCl$_3$) δ 4.11 (q, J=7.1 Hz, 2H), 3.18 (t, J=7.1 Hz, 2H), 2.27 (t, J=7.6 Hz, 2H), 1.81 (p, J=7.1 Hz, 2H), 1.60 (p, J=7.4 Hz, 2H), 1.37 (q, J=6.8, 6.4 Hz, 2H), 1.33-1.20 (m, 15H). $^{13}$C NMR (151 MHz, CDCl$_3$) δ 174.03, 60.28, 34.52, 33.69, 30.63, 29.58, 29.51, 29.37, 29.26, 29.25, 28.66, 25.11, 14.40, 7.51.

Example 9: Synthesis of 9(10),12(13)-diodooctadecanoic acid

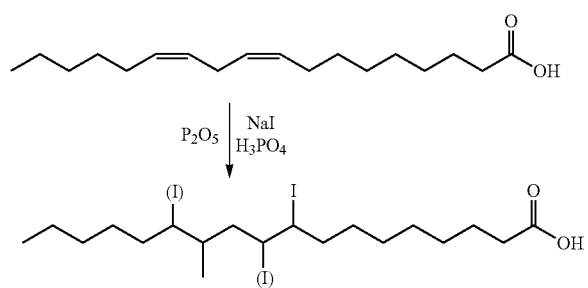

Phosphorus pentoxide (2.82 g, 20.0 mmol, 2 eq), linoleic acid (3.00 g, 10.7 mmol, 1 eq), sodium iodide (6.00 g, 40.0 mmol, 4 eq) and phosphoric acid (20 mL, c=0.50 M) were stirred under nitrogen atmosphere at 70° C. for 12 h and for 1 h30 at room temperature under low stirring. Ether (50 mL) and water (20 mL) were added to the reaction mixture. The aqueous phase was extracted with ethyl acetate and the combined organic phases were washed with sodium thiosulfate (0.1 M), saturated brine, dried over sodium sulfate, filtered off and evaporated under reduced pressure. The crude product was purified by flash chromatography using dichloromethane/methanol gradient+0.1% acetic acid to obtain a light yellowish solid (4.875 g, 9.09 mmol, 85% yield). ESI MS 558.5 [M+Na]$^+$, 553.5 [M+NH$_4$]$^+$. 574.5 [M+K]$^+$. $^1$H NMR (600 MHz, CDCl$_3$) δ 4.14-4.05 (m, 2H), 2.35 (m, 2H), 1.96-1.80 (m, 2H), 1.76-1.61 (m, 3H), 1.57-1.49 (m, 3H), 1.46-1.27 (m, 16H), 0.90 (7, J=6.8 Hz, 3H).

Example 10: Synthesis of Triiodooctadecanoic Acid and Ethyl Triiodooctadecanoate

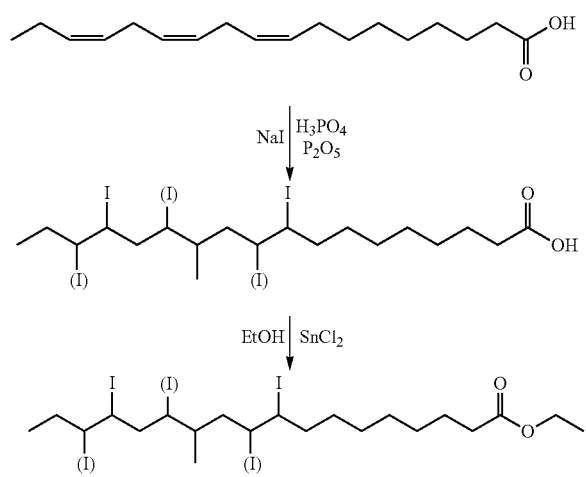

Example 11: Imaging of Browning Adipose Tissue in a Mouse Model of Cachexia

The CT contrast agent under the form of a nano-emulsion was given to three groups of mice. The group A was control (no tumor) whereas groups B and C bare a Lewis lung syngeneic tumor, a recognized mouse model of cachexia[2]. 7, 13 and 27 days after tumor injection, the mice from groups A and C were given the CT contrast agent by oral route at a dose of 3400 mg/kg body weight. 24 hours after each administration, the mice from all groups underwent microCT scan. The contrast agent was taken up by the brown adipose tissue, as seen on FIGS. 1 and 2. The uptake and contrast enhancement were highest in group C (with tumor), especially in the popliteal area (FIG. 2). No contrast enhancement was visible in group B, in which no contrast agent was given. In group C, contrast enhancement was visible from day 8 after tumor inoculation, when no weight loss was recorded and the tumors were still hardly detectable (FIG. 3). Furthermore, in the popliteal area, contrast enhancement was correlated with tumor growth (FIG. 4). It shows that the CT contrast agent according to the invention is able to detect changes in adipose tissue at a very early cancer stage and that these changes are correlated with tumor growth. Furthermore, the increased contrast in the popliteal area was apparent even at day 14 when the weight of the mice was unchanged with minimal loss of body fat indicating the ability to detect precachexia (early cachexia).

Example 12: Imaging of Activated Brown and Beige Adipose Tissue

A mouse was housed at 6° C. for a week to activate BAT. It was then given the CT contrast agent per os and imaged by CT 24 hours later. The CT contrast agent was taken up by all brown and beige adipose tissue, which were visible on the CT scan. The 3D reconstruction and the corresponding adipose tissue are shown in FIG. 5.

Example 13: Imaging of Browning Adipose Tissue in a Mouse

The CT contrast agent under the form of a nano-emulsion was given to three groups of mice. Group A was control (no tumor) whereas groups B and C bare a Lewis lung syngeneic tumor. 13 days after tumor injection, the mice from groups A and C were given the CT contrast agent by oral route at a dose of 3400 mg/kg body weight. 24 hours after each administration, the mice from all groups underwent microCT scan. The resulting scans are presented in FIG. 2 (A2, B2 and C2). Contrast enhancement is absent in group B, in which no contrast agent was given. A comparison between the CT scans of group A (healthy control animals) and group C (tumor-bearing animals) shows a clear contrast enhancement in the latter group. The CT contrast agent clearly discriminates mice with tumors by identifying zones of brown and/or beige adipose tissues in comparison to healthy mice. It demonstrates that the CT contrast agent according to the invention is able to detect changes in adipose tissues at a very early stage of cachexia (precachexia), before any weight loss is observed (i.e. on day 14 of lung cancer development, FIG. 4c). The contrast enhancement in adipose tissues increases as the cachexia syndrome progresses demonstrating the ability to determine the cachexia stage according to the level of adipose tissue browning (FIG. 4c).

FIG. 4c also demonstrates that at day 14 the contrast intensity in group C is increased indicating it is now possible to detect early cachexia (precachexia) and/or early lung cancer. Applicant's own data and the literature show that at day 14 in this cancer model the mice do not lose any body weight, meaning they are in precachexia and/or early cachexia stage (FIG. 3a).

REFERENCES

1. Fearon, K. et al. Definition and classification of cancer cachexia: an international consensus. *Lancet Oncol.* 12, 489-495 (2011).
2. Ballaró, R., Costelli, P. & Penna, F. Animal models for cancer cachexia. *Curr. Opin. Support. Palliat. Care* 10, 281-287 (2016).
3. Vaitkus, J. A. & Celi, F. S. The role of adipose tissue in cancer-associated cachexia. *Exp. Biol. Med.* Maywood NJ 242, 473-481 (2017).
4. Argilés, J. M., Busquets, S., Stemmler, B. & López-Soriano, F. J. Cancer cachexia: understanding the molecular basis. *Nat. Rev. Cancer* 14, 754-762 (2014).
5. Argilés, J. M. et al. The cachexia score (CASCO): a new tool for staging cachectic cancer patients. *J. Cachexia Sarcopenia Muscle* 2, 87-93 (2011).
6. Kir, S. et al. Tumour-derived PTH-related protein triggers adipose tissue browning and cancer cachexia. *Nature* 513, 100-104 (2014).
7. Sampath, S. C., Sampath, S. C., Bredella, M. A., Cypess, A. M. & Torriani, M. Imaging of Brown Adipose Tissue: State of the Art. *Radiology* 280, 4-19 (2016).
8. Ferreira, A. B., Cardoso, A. L. & da Silva, M. J. Novel and Highly Efficient SnBr2-Catalyzed Esterification Reactions of Fatty Acids: The Notable Anion Ligand Effect. *Catal. Lett.* 143, 1240-1246 (2013).
9. Anker, M. S. et al. Orphan disease status of cancer cachexia in the USA and in the European Union: a systematic review. *J. Cachexia Sarcopenia Muscle* 10, 22-34 (2019).

The invention claimed is:

1. A method of diagnosing cachexia or precachexia in a subject, the method comprising the steps of:
    a) orally administering a peroral contrast agent to the subject, the peroral contrast agent comprising a biocompatible formulation of an iodinated fatty acid, ester, or combinations thereof with 16 to 18 carbon atoms having the following formula I:

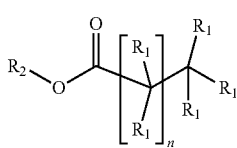

Formula I wherein:
    $n=14-16$;
    $R_1$ is, at each occurrence, independently H or I, provided that when a number of iodine atoms is 1 to 6, the iodine atoms are not geminal or vicinal; and
    $R_2$ is H, unsaturated alkyls, saturated alkyls, linear alkyls, branched alkyls, alkoxyalkyl, hydroxyalkoxyalkyl, polyhydroxyalkyl, or hydroxy poly alkyleneoxyalkyl;
    b) obtaining an in vivo image of brown and/or beige adipose tissue (BAT) in the subject with Computed Tomography (CT); and
    c) comparing the obtained in vivo image to a CT scan of a normal subject, wherein a diagnosis of cachexia or precachexia is performed by:
        i) establishing positive or increased enhancement of BAT and/or beige adipose tissue; or
        ii) detecting a white adipose tissue (WAT) browning and/or BAT activity in the subject.

2. The method according to claim 1, wherein the peroral contrast agent is used for non-invasive in vivo imaging, quantification, and/or monitoring of the activity of the BAT and/or beige adipose tissue in the subject.

3. The method according to claim 1, wherein the in vivo image of the subject is obtained by a positron emission tomography computed tomography (PET-CT) imaging.

4. The method according to claim 1, wherein the biocompatible formulation is an ethiodized oil formulation.

5. The method according to claim 1, wherein the biocompatible formulation is an emulsion.

6. The method according to claim 5, wherein the emulsion is a nano-emulsion.

7. The method according to claim 6, wherein the peroral contrast agent consists of a biocompatible nano-emulsion of iodinated fatty acids having 16 to 18 carbon atoms.

8. The method according to claim 6, wherein the iodinated fatty acid is an iodinated linolenic acid.

9. The method according to claim 6, wherein the nano-emulsion comprises biocompatible emulsifiers selected from the group consisting of lecithin, polyethylene glycol ethers with fatty alcohols, polysorbates and sorbitan esters, or combinations thereof.

10. The method according to claim 9, wherein the amount of the biocompatible emulsifier is between 5-30% (w/w) of the total nano-emulsion.

11. The method according to claim 1, wherein the peroral contrast agent is administered at a dose between 0.005 and 1.6 mg of iodine per gram of body weight.

12. The method according to claim 1, wherein the cachexia is a cancer cachexia.

13. The method according to claim 1, wherein the cachexia is a non-cancer cachexia associated with a disorder selected from the group consisting of HIV/AIDS, chronic kidney disease, chronic obstructive pulmonary disease (COPD), chronic heart failure, tuberculosis, Crohn's disease, chronic bowel disease, rheumatoid arthritis, or geriatric cachexia.

14. The method according to claim 1, wherein the method is configured for diagnosing early stages of cachexia in a subject suffering or suspected to suffer thereof.

15. The method according to claim 14 wherein the diagnosing early stages of cachexia is done before the subject has lost more than 5% body weight.

* * * * *